(12) United States Patent
Iwashita et al.

(10) Patent No.: US 8,276,732 B2
(45) Date of Patent: Oct. 2, 2012

(54) CLUTCH DEVICE

(75) Inventors: Kanau Iwashita, Saitama (JP); Yoshiaki Tsukada, Saitama (JP); Yoshihisa Ieda, Saitama (JP); Akihiko Tomoda, Saitama (JP); Akihiro Iimuro, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1407 days.

(21) Appl. No.: 11/902,769

(22) Filed: Sep. 25, 2007

(65) Prior Publication Data
US 2008/0078641 A1    Apr. 3, 2008

(30) Foreign Application Priority Data
Sep. 28, 2006   (JP) ................................. 2006-266011

(51) Int. Cl.
*F16D 25/08* (2006.01)
*F16D 23/12* (2006.01)

(52) U.S. Cl. ..... 192/83; 192/85.5; 192/85.55; 192/99 S; 192/85.57

(58) Field of Classification Search ............... 192/85.55, 192/85.6
See application file for complete search history.

(56) References Cited

U.S. PATENT DOCUMENTS

| | | | |
|---|---|---|---|
| 7,591,358 B2 * | 9/2009 | Pick .................. | 192/83 |
| 7,673,729 B2 * | 3/2010 | Fujimoto et al. ............ | 192/48.3 |
| 2005/0167232 A1 * | 8/2005 | Kosugi et al. ............... | 192/85 R |
| 2005/0189190 A1 * | 9/2005 | Kowalsky et al. .............. | 192/20 |
| 2006/0191766 A1 * | 8/2006 | Konukiyo et al. .............. | 192/86 |
| 2006/0213747 A1 * | 9/2006 | Matzschker ................. | 192/84.6 |

FOREIGN PATENT DOCUMENTS

| | | |
|---|---|---|
| JP | 6-117450 A | 4/1994 |
| JP | 8-133169 A | 5/1996 |
| JP | 2874481 A | 1/1999 |
| JP | 2005-248976 A | 9/2005 |

* cited by examiner

*Primary Examiner* — David D Le
*Assistant Examiner* — Ryan Dodd
(74) *Attorney, Agent, or Firm* — Birch, Stewart, Kolasch & Birch, LLP

(57) ABSTRACT

A clutch device is configured to include a clutch mechanism, a clutch actuator operatively engaging and disengaging the clutch mechanism, a clutch lever, and an assist pressure generator which generates assist hydraulic pressure by driving an electric motor. The assist hydraulic pressure is supplied to the clutch actuator to operatively engage and disengage the clutch mechanism. The clutch device further includes a first turning angle sensor which detects the turn operation angle of the clutch lever, a control unit which controllably drives the electric motor based on the turning operation amount of the clutch lever and adjusts the driving force generating gain characteristic of the electric motor, and a gain adjustment knob which variably sets the gain characteristic. The clutch device makes it possible to changeably set the magnitude of an assist force of an assist device according to a rider's preference.

7 Claims, 34 Drawing Sheets

CLUTCH DEVICE

CROSS-REFERENCE TO RELATED APPLICATION

The present application claims priority under 35 U.S.C. §119 to Japanese Patent Application No. 2006-266011, filed Sep. 28, 2006, the entire contents of which are hereby incorporated by reference.

BACKGROUND OF THE INVENTION

1. Field of the Invention

The present invention relates generally to clutch devices suitable for motorcycles or the like. In particular, the invention relates to a clutch device configured to use hydraulic pressure produced in response to the manual operation of a clutch lever by a rider (operator) to engage and disengage a clutch mechanism.

2. Description of Background Art

Motorcycles or the like generally use a configuration in which a left one of handlebars is provided with a manually operated clutch lever, which is gripped with a rider's left hand to operatively engage and disengage a clutch mechanism. In such a clutch device, the clutch mechanism usually undergoes a spring force or the like to come into an engagement state. When starting or shifting, a rider grips the clutch lever with a hand to disengage and engage the clutch mechanism. This needs gripping power to release the clutch mechanism against the spring force to engage the clutch mechanism. It is expected to reduce the operation force for female riders having small gripping power. It can be said that it is effective to reduce such an operation force particularly in large-sized motorcycles which needs large clutch capacity and has a large clutch engaging force.

In view of the forgoing, for instance, each of Japanese Patent Laid-open No. Hei 8-133169, Japanese Patent No. 2874481, Japanese Patent Laid-open No. Hei 6-117450, and Japanese Patent Laid-open No. 2005-248976 disclose a devices configured to assist clutch lever operation for releasing a clutch mechanism.

Among them, an assist device of Japanese Patent Laid-open No. Hei 8-133169, for instance, is configured to apply pressurized oil for forcibly lubricating the inside of an engine to a plunger, which presses a push rod to the release side to release the clutch mechanism, thus providing an assist force for the release side (that is, an assist force on the side of manually operating the clutch lever).

Use of such an assist device can alleviate the problem as mentioned above. However, the assist device disclosed in Japanese Patent Laid-open No. Hei 8-133169 is configured to use the lubricating pressure of the engine to provide an assist force. The assist device is influenced by engine rotation, lubricating oil, etc. to vary in assist force. Thus, there arises a problem in that it is difficult to provide a stable assist force.

The assist device of Japanese Patent No. 2874481 is configured such that a clutch cable connected to a clutch lever is wound around a rotary body driven by a motor and the assist device assists the operation force of the clutch lever when the clutch mechanism is released by operating the clutch lever. As mentioned above, this conventional assist device is configured to assist the operation force of the clutch lever operated. Therefore, if the so-called auto-clutch mechanism is used in which shift change is performed only by operating a shift pedal without operating the clutch lever, then the clutch mechanism cannot be released by the assist force of the assist device as mentioned earlier.

Further, the magnitude of an assist force is set at a constant level in the conventional assist device. If the assist force is set at a level greater than gripping power, the reaction force applied to the rider who is operating the clutch lever is smaller than the assist force set at a level greater than the gripping power. In such a case, some riders may feel a void since they feel the operation of the clutch lever to be light. Therefore, a configuration has been desired in which the setting of the assist force can be changed according to the rider's preference. For example, a configuration has been desired in which the magnitude of the assist force can be set at a small level for the rider having large hands or large gripping power.

In view of the foregoing, it is an object of the present invention is to provide a clutch device that is provided with an assist device configured to change the setting of the magnitude of an assist force according to a rider's preference.

SUMMARY AND OBJECTS OF THE INVENTION

To solve the above problem, a clutch device according to the present invention includes: a clutch mechanism which is disposed in a power transmission route for transmitting a rotational drive force of an engine to a wheel to connect and disconnect transmission of the rotational drive force; a clutch actuator which operatively engages and disengages the clutch mechanism; a clutch lever which is provided on the operating handlebar and operated by a rider; and an assist pressure generator which generates assist pressure by driving an electric motor in response to the operation of the clutch lever; wherein assist pressure generated by the assist pressure generator is supplied to the clutch actuator and used as an assist force to operatively engage and disengage the clutch mechanism in response to operation of the clutch lever. In addition, the clutch device includes: a lever turning sensor (e.g., a first turning angle sensor 39 in the embodiment) which detects a turning-operation amount of the clutch lever; a gain adjustment device (e.g., the control unit 90 in the embodiment) which controllably drives the electric motor on the basis of the operation amount of the clutch lever detected by the lever turning sensor and adjusts a driving force generation gain characteristic of the electric motor; and gain setting means (e.g., the gain adjustment knob 91 in the embodiment) which variably sets the driving force generation gain characteristic by external operation; wherein the gain adjustment device uses a gain characteristic set by the external operation of the gain setting means to controllably drive the electric motor in response to the operation of the clutch lever.

To solve the above problem, a clutch device according to the present invention includes: a clutch mechanism which is disposed in a power transmission route for transmitting a rotational drive force of an engine to a wheel to connect and disconnect transmission of the rotational drive force; a clutch actuator which operatively engages and disengages the clutch mechanism; a clutch lever which is provided on the operating handlebar and operated by a rider; and an assist pressure generator which generates assist pressure by driving an electric motor in response to the operation of the clutch lever; wherein assist pressure generated by the assist pressure generator is supplied to the clutch actuator and used as an assist force to operatively engage and disengage the clutch mechanism in response to operation of the clutch lever. In addition, the clutch actuator includes: a first clutch actuation input portion (the clutch actuation input assembly 80 in the embodiment) which receives an actuation force through an actuation force transmission member (the clutch cable 59 in the embodiment) connected to the clutch lever, the actuation force operatively engaging and disengaging the clutch mechanism in response to the operation of the clutch mechanism; and a second clutch actuation input portion (e.g., the clutch slave cylinder 21 in the embodiment) which receives the assist hydraulic pressure via an assist oil passage connected to the assist pressure generator, the assist hydraulic pressure operatively engaging and disengaging the clutch mechanism in response to the operation of the clutch lever.

To solve the above problem, a clutch device according to the present invention includes: a clutch mechanism which is disposed in a power transmission route for transmitting a rotational drive force of an engine to a wheel to connect and disconnect transmission of the rotational drive force; a clutch actuator which operatively engages and disengages the clutch mechanism; a clutch lever which is provided on the operating handlebar and operated by a rider; and an assist pressure generator which generates assist pressure by driving an electric motor in response to the operation of the clutch lever; wherein assist pressure generated by the assist pressure generator is supplied to the clutch actuator and used as an assist force to operatively engage and disengage the clutch mechanism in response to operation of the clutch lever. In addition, the assist pressure generator includes an assist-purpose crankshaft (e.g., the crankshaft 234 in the embodiment) rotatably driven by the electric motor and an assist-purpose cylinder (e.g., the motor actuator 40 in the embodiment) and a piston member (e.g., the piston 42 in the embodiment) of the assist-purpose cylinder driven by a crank portion (the driven crankshaft 234*b* in the embodiment) of the assist-purpose crankshaft rotatably driven by the electric motor is moved in a reciprocative manner in a cylinder chamber to generate the assist hydraulic pressure. In addition, the assist-purpose crankshaft is connected to the clutch lever via an operation force transmission member (e.g., the clutch cable 59 in the embodiment) and can be rotatably driven also by receiving an actuation force transmitted thereto via the operation force transmission member, the actuation force being adapted to engage and disengage the clutch mechanism in response to the operation of the clutch lever.

In the clutch device configured as described above, preferably, the clutch actuator is configured to include a pressing member (e.g., the push rod 18 in the embodiment) which is pressed by the assist hydraulic pressure to transmit the assist hydraulic pressure to the clutch mechanism for releasing actuation.

To solve the above problem, a clutch device includes: a clutch mechanism which is disposed in a power transmission route for transmitting a rotational drive force of an engine to a wheel to connect and disconnect transmission of the rotational drive force; a clutch actuator which operatively engages and disengages the clutch mechanism; a clutch lever which is provided on the operating handlebar and operated by a rider; a clutch hydraulic pressure generator which is operated in response to the operation of the clutch lever to generate the clutch hydraulic pressure supplied to the clutch actuator, and an assist pressure generator which generates assist pressure by driving an electric motor in response to the operation of the clutch lever; wherein assist pressure generated by the assist pressure generator is supplied to the clutch actuator and used as an assist force to operatively engage and disengage the clutch mechanism. In addition, the clutch actuator includes: a clutch hydraulic pressure input portion (e.g., the inlet port 324*a*, 424*a*) which receives the clutch hydraulic pressure via a clutch hydraulic passage connected to the clutch hydraulic generator, the clutch hydraulic pressure operatively engaging and disengaging the clutch mechanism in response to the operation of the clutch lever; and an assist hydraulic pressure input portion (e.g., inlet port 362*a*, 426*a* in the embodiment) which receives the assist hydraulic pressure via an assist hydraulic passage connected to the assist pressure generator, the assist hydraulic pressure operatively engaging and disengaging the clutch mechanism in response to the operation of the clutch lever.

Further, in the clutch device configured as described above, the clutch actuator is configured to include a pressing member (e.g., the push rod 18 in the present embodiment) which is pressed by at least one of the clutch hydraulic pressure and the assist hydraulic pressure to transmit at least one of the assist hydraulic pressure (the clutch hydraulic pressure) and the assist hydraulic pressure to the clutch mechanism for releasing actuation.

Effects of the invention include the following:

The clutch device according to the present invention is configured so that the rider can optionally change the setting of the magnitude of the assist force for assisting the operation force at the time of operating the clutch lever. Therefore, the assist force can be adjusted according to the rider's preference. With such a configuration, for the rider having large hands or large griping power, if the magnitude of the assist force is set at a small level, the driver can undergo a sufficient lever reaction force. It is possible to eliminate a void resulting from the rider feeling the operation of the clutch lever to be light. If the magnitude of the assist force is set at a large level, however, it is possible to lighten the operation of the clutch lever when a female rider or the like with small hands rides the motorcycle. Thus, it is not hard to operate the clutch lever.

The clutch device according to the present invention is configured such that the clutch actuator which operatively engaging and disengaging the clutch mechanism includes: a first clutch actuation input portion which receives an operation force through an actuation force transmission member connected to the clutch lever and a second clutch actuation input portion which receives the assist hydraulic pressure via an assist oil passage connected to the assist pressure generator. It is possible to operatively engage and disengage the clutch mechanism only by the operation force of the operation lever operated by the rider, that is, without the aid of the assist hydraulic pressure. An event may occur in which for instance electric power supply to the electric motor is interrupted during travel to make it impossible to generate assist pressure by driving the electric motor. Even such an event occurs, it is possible to operate the clutch lever without use of the assist pressure to operatively engage and disengage the clutch mechanism, thereby enabling travel without trouble. Such an effect can similarly achieved by the clutch device configured such that the assist-purpose crankshaft which constitutes part of the assist pressure generator and is rotatably driven by the electric motor is connected to the clutch lever via the operation force transmitting member (the constitution of claim 3).

Further, the assist hydraulic pressure to be supplied to the second clutch actuation input portion is transmitted to the clutch mechanism via the pressing member not via fluid such as hydraulic oil. Thus, it is possible to reduce the time taken to operatively release the clutch mechanism compared with the case where the assist hydraulic pressure is transmitted via fluid such as hydraulic oil. In short, it is possible to substantially eliminate a time lag.

The clutch actuator which operatively engages and disengages the clutch mechanism includes the clutch hydraulic pressure input portion which receives the clutch hydraulic pressure generated by the clutch hydraulic generator and the assist hydraulic pressure input portion which receives the assist hydraulic pressure generated by the assist pressure generator. Thus, the following effect can be achieved. That is to say, it is possible to appropriately select a manual mode, an auto-clutch mode or an assist mode. In the manual mode, the clutch mechanism is operatively engaged and disengaged by supplying hydraulic pressure only to the clutch hydraulic pressure input portion and only by operating the clutch lever by the rider (in the embodiment described later, if the assist clutch mode is set, the assist power setting knob 91 is set at the "0-level"). In the auto-clutch mode, the clutch mechanism is operatively engaged and disengaged only by the assist hydraulic pressure by supplying hydraulic pressure only to the assist hydraulic pressure input portion. In the assist mode, the clutch mechanism is operatively engaged and disengaged by both the clutch hydraulic pressure and assist hydraulic pressure by supplying hydraulic pressure to both the clutch hydraulic pressure input portion and the assist hydraulic pressure input portion. For example, it is possible to travel comfortably (during traffic congestion the auto-clutch mode is set for instance) by selecting the above modes in accordance with e.g., road surface conditions, road conditions (during traffic congestion), or the requests of the rider such as the size, gripping power or the like of the rider's hand.

Further, the clutch actuator is configured to include two input portions, the clutch hydraulic pressure input portion and the assist hydraulic pressure input portion. Even in this case, the hydraulic pressure to be supplied is applied to the clutch mechanism not via fluid such as hydraulic oil but via the pressing member. Therefore, it is possible to reduce the time taken to operatively release the clutch mechanism as compared with the case where the hydraulic pressure is applied via the fluid such as hydraulic oil. In shot, a time lag can substantially be eliminated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
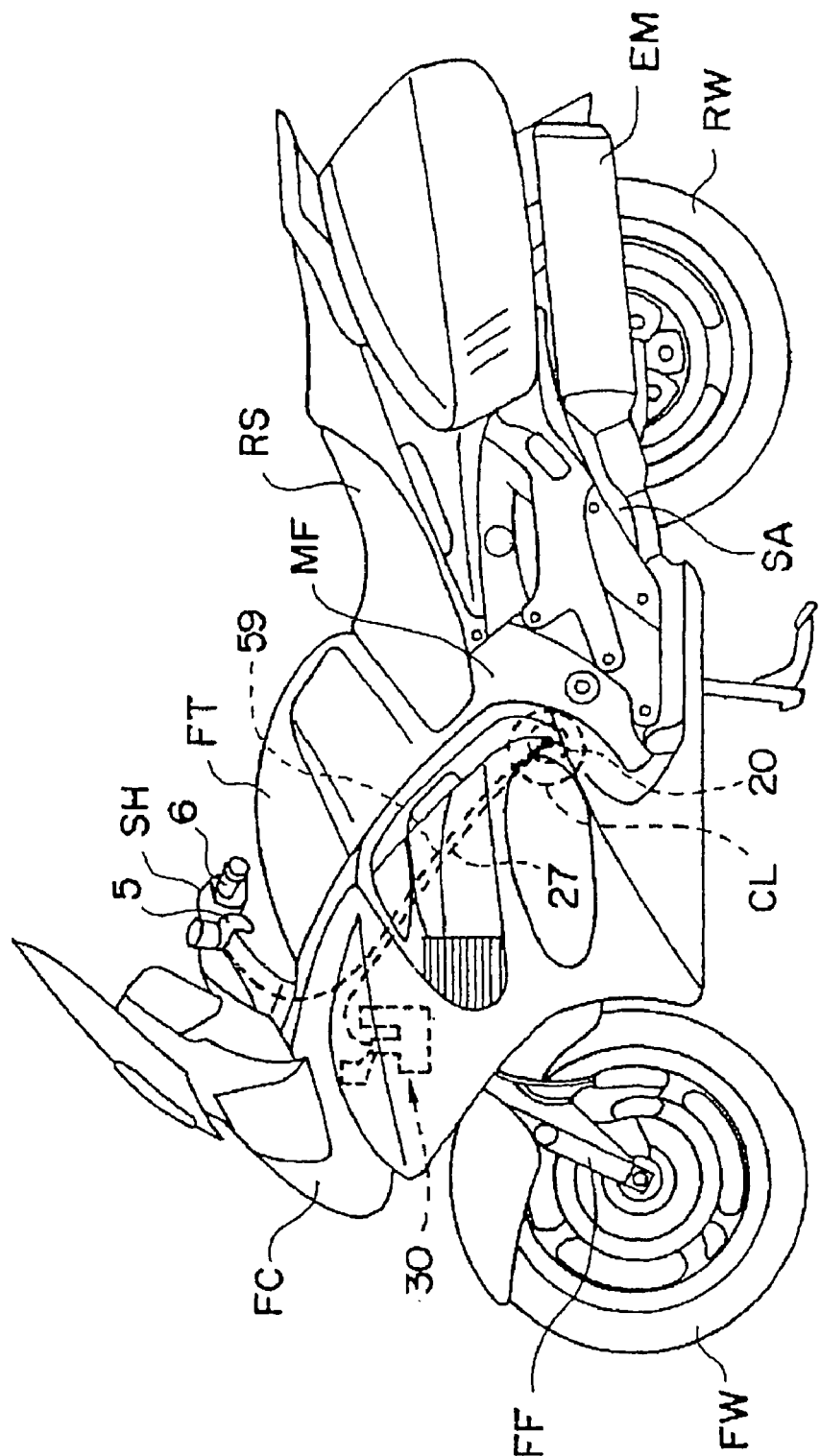
FIG. 2 is a lateral view illustrating the entire external appearance of a motorcycle equipped with the clutch device.

At the beginning, a first embodiment of the present invention is described. FIG. 2 illustrates the entire external appearance of a motorcycle provided with a clutch device according to the present invention. This motorcycle includes a main frame MF, a front fork FF, a front wheel FW, steering handlebars SH, a front cover FC, a swing arm SA, and a rear wheel RW. The front fork FF is connected to the front end of the main frame MF so as to be turnable (steerable) around a shaft extending obliquely upward and downward. The front wheel FW is rotatably attached to the lower end of the front fork FF. The steering handlebars SH are integrally attached to the upper end of the front fork FF so as to extend leftward and rightward. The front cover FC is attached to the front portion of the main frame MF so as to cover the surround of the upper portion of the front fork FF from the front and from the left and right sides. The swing arm SA is swingably up and down connected to the rear portion of the main frame MF to extend rearward. The rear wheel RW is rotatably attached to the rear end of the swing arm SA. A fuel tank FT, a rider's seat RS, an exhaust muffler EM and the like are mounted on the main frame MF as illustrated in the figure.

Figure 3:
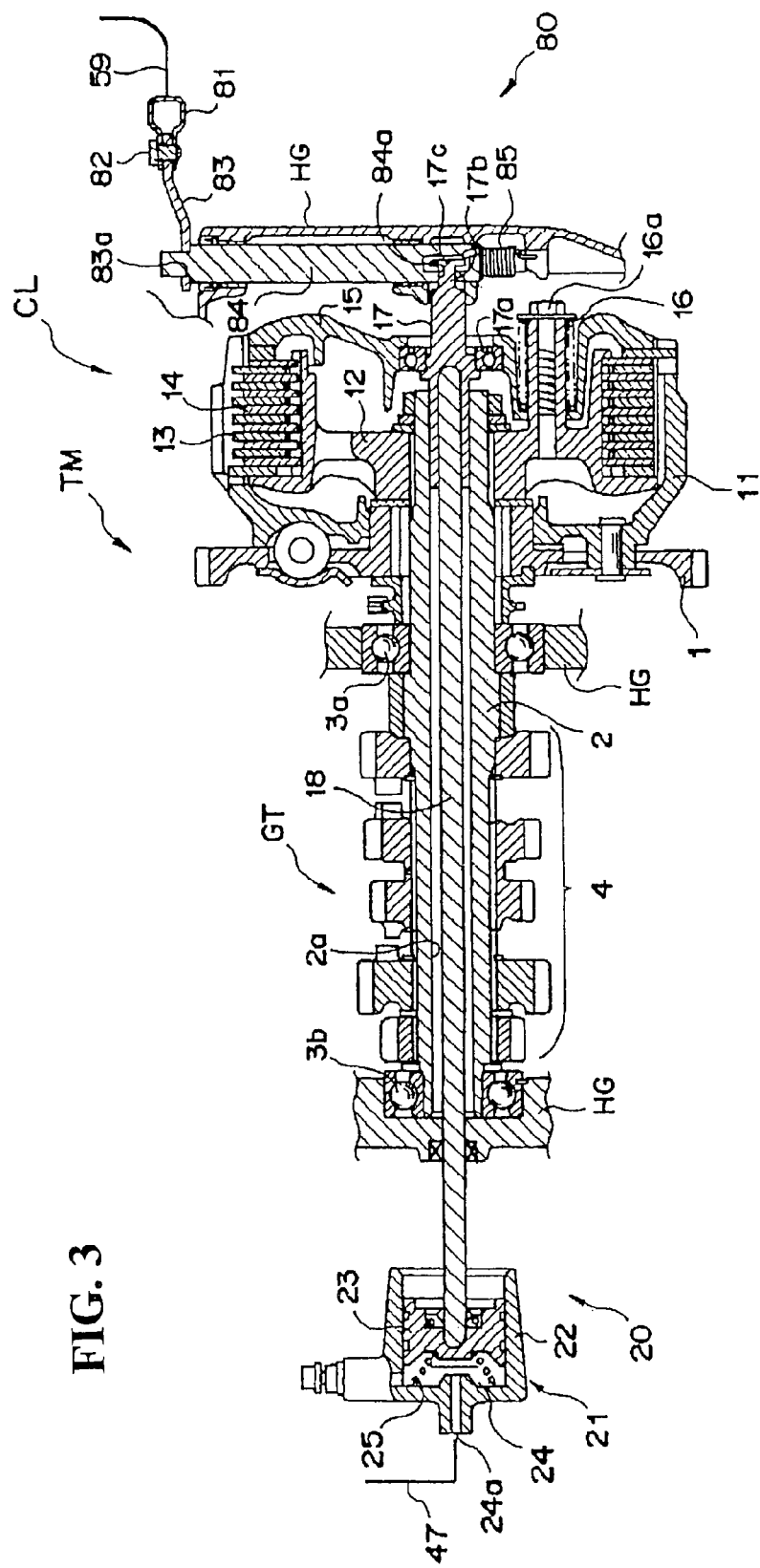
FIG. 3 is a cross-sectional view of the partial configuration of a power unit provided for the motorcycle.
Figure 4:
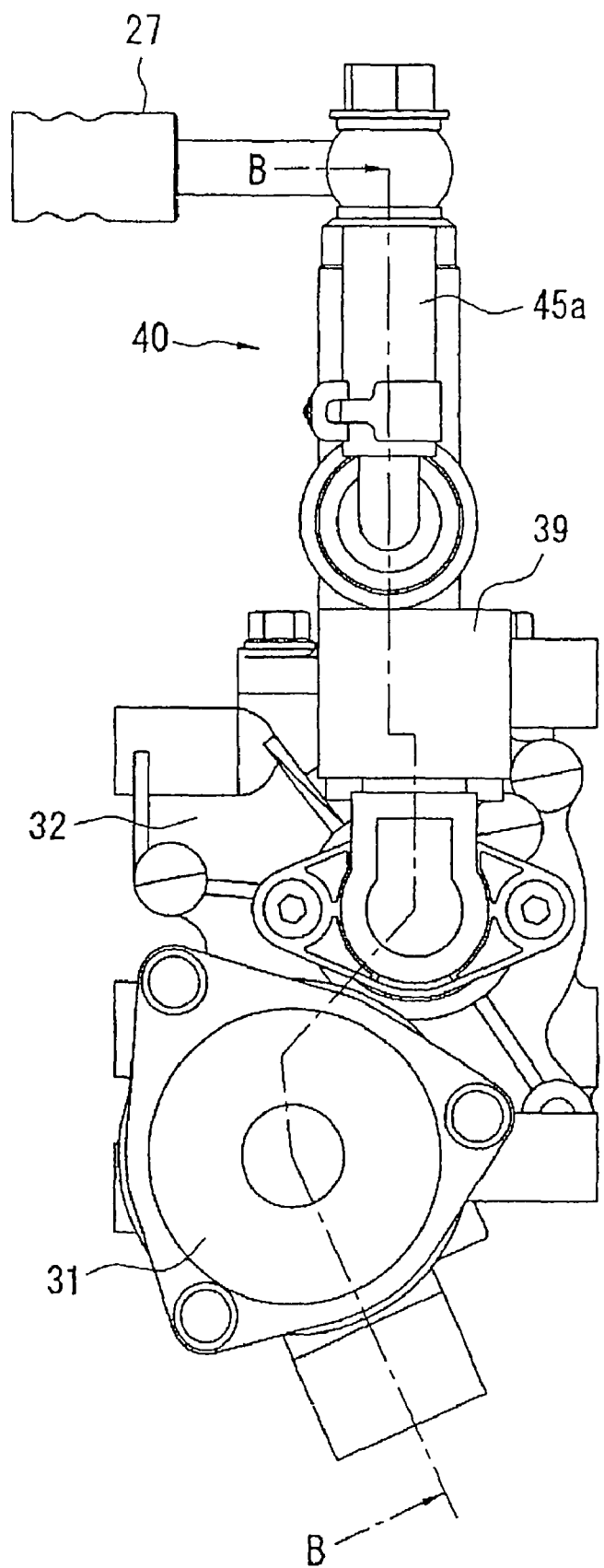
FIG. 4 is a front view illustrating a motor actuator constituting part of the clutch device.
Figure 5:
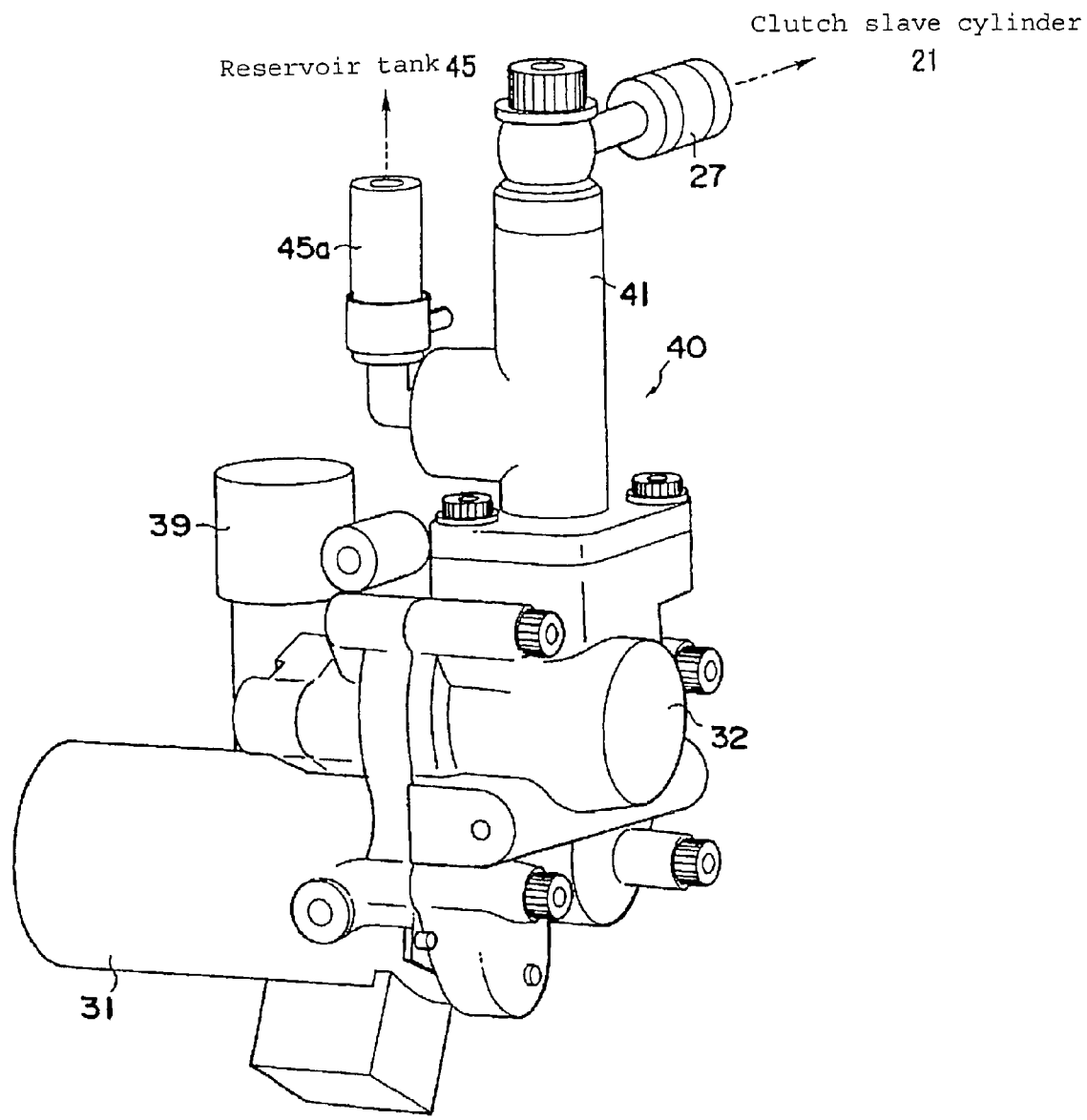
FIG. 5 is a perspective view illustrating the external appearance of the motor actuator.

A power unit (not shown) integrally including an engine and a transmission is attached so as to be located at an inner space covered by a front cover FC. FIG. 3 illustrates a portion (the portion on the side of an input shaft which receives engine rotation via a clutch CL) of a transmission TM constituting part of the power unit. The transmission TM is configured such that a plurality of drive gears 4 are arranged on an input shaft 2 rotatably carried by a housing HG via bearings 3a, 3b. In addition, the drive gears 4 are meshed with a plurality of driven gears (not shown) arranged on the output shaft not shown rotatably supported by the housing HG. A transmission mechanism not shown selects a power train for power transfer. An engine drive gear 1 and a clutch mechanism CL are coaxially arranged on the input shaft 2. The engine drive gear 1 meshes with a gear carried on the crankshaft of the engine to receive engine rotation transferred therefrom for rotatable driving. The clutch mechanism CL causes the engine drive gear 1 to be engaged with and disengaged from the input shaft 2.

The clutch mechanism CL includes a drive member 11, a driven member 12, a plurality of separator plates 13, friction plates 14 and a pressing member 15. The drive member 11 is joined to the engine drive gear 1 for integral rotation therewith. The driven member 12 is splined to the input shaft 2 for integral rotation therewith. The separator plates 13 are attached to the inner circumference of the drive member 11 so as to be movable axially for integral rotation therewith. The friction plates 14 are attached to the outer circumference of the driven member 12 so as to be alternately put between the separator plates 13 and to be movable axially for integral rotation therewith. The pressing member 15 is attached to the lateral end of the driven member 12 so as to be pressed leftward in FIG. 3 by a pressing spring 16 retained by a bolt 16a.

The outer circumference of the pressing member 15 axially faces the separator plate 13 and the friction plate 14. The pressing member 15 undergoes the biasing force of the pressing spring 16 to press both the plates 13, 14 axially leftward for frictional engagement. As a result, the engine rotation driving force transmitted to the engine drive gear 1 is transmitted from the drive member 11 through both the plates 13, 14 frictionally engaged with each other to the driven member 12, thus rotatably driving the input shaft 2. The rotation of the input shaft 2 is changed in speed by the transmission TM mentioned above and transmitted to the rear wheel RW through a chain mechanism not shown. Thus, the rear wheel RW is rotatably driven to run the motorcycle.

As described above, the clutch mechanism CL is configured to be usually engaged using the biasing force of the pressing spring 16. A driver releases the clutch mechanism CL by gripping and pulling the clutch lever 5 while putting his or her left hand on the left grip portion of the steering handlebars SH, thereby interrupting rotation driving force transferred from the engine drive gear 1 to the input shaft 2. A description is below made of how the clutch device is configured to engage and disengage the clutch mechanism as above.

To release the clutch mechanism CL, the pressing member 15 is moved in a direction (the right direction in FIG. 3) opposite to the biasing direction of the pressing spring 16 to release the force pressing the separator plates 13 and friction plates 14 with each other, thereby releasing the frictional engagement therebetween. The configuration to achieve such operation is as below. A pull rod 17 is disposed on the inner circumferential portion of the pressing member 15 via a bearing 17a. A push rod 18 is disposed to extend in a communicating hole 2a which passes through the input shaft 2 along the central axis thereof. The leading end of the push rod 18 is abutted against the pull rod 17 which is provided coaxially with the longitudinally axial direction of the push rod 18. The proximal portion of the push rod 18 is abutted against a clutch slave piston 23 constituting part of a clutch slave cylinder 21. The configuration composed of the clutch slave cylinder 21, the push rod 18, the pull rod 17 and a clutch actuation input assembly 80 described later is called a clutch actuator 20.

The clutch mechanism CL is attached with a clutch actuation input assembly 80 connected to an end of a clutch cable 59 extending from the clutch lever 5. The clutch actuation input assembly 80 is configured to include a clutch cable attachment member 81, an attachment pin 82, a clutch arm 83 and a shaft member 84.

The end of the clutch cable 59 is fixedly attached to the clutch cable attachment member 81 almost U-shaped in cross-section. The clutch cable attachment member 81 is attached to one end of the clutch arm 83 with an attachment pin 82. The shaft member 84 formed about circular to extend upward and downward is fitted into a shaft fitting hole 83a bored in the other end portion of the clutch arm 83. The shaft member 84 can be turned around its longitudinally axial direction extending upward and downward. The shaft member 84 is formed with a pull rod fitting-insertion hole 84a adapted to receive one end of the pull rod 17 insertably fitted thereinto. The pull rod 17 is formed at its end with a diameter-reduced portion 17b having a smaller diameter than the other portions. This diameter-reduced portion 17b is insertably fitted into the pull rod fitting-insertion hole 84a. A pull rod end portion 17c is located at a position closer to the end of the pull rod 17 than the diameter-reduced portion 17b and has a larger diameter than the diameter-reduced portion 17b. The pull rod end portion 17c penetrates inside the shaft member 84. Thus, when the clutch cable 59 is pulled to turn the shaft member 84 via the clutch arm 83, the pull rod end portion 17c is pulled rightward in FIG. 3 along with the turning of the shaft member 84. Then, the entire pull rod 17 moves rightward in FIG. 3, which causes the pressing member 15 to move rightward against the biasing force of the pressing spring 16, thereby releasing the clutch mechanism CL.

A return spring 85 is wound around the outer circumference of the lower end portion of the shaft member 84. One end of the return spring 85 is secured to the shaft member 84 and the other end is secured to the housing HG. Thus, if the clutch cable 59 is returned from its pulled state, the shaft member 84 is turned by the biasing force of the return spring 85 in a direction opposite to the direction where the clutch cable 59 is pulled, so that the pull rod 17 is returned leftward in FIG. 3. Then, the biasing force of the pressing spring 16 brings the separator plate 13 and friction plate 14 into frictional engagement with each other. In short, pullback of the clutch cable 59 moves the pull rod 17 to operatively engage and disengage the clutch mechanism CL.

In the present embodiment, the clutch mechanism CL is operatively engaged and disengaged by the following configuration as well as by the pullback of the clutch cable 59 as described above. The clutch slave cylinder 21 is configured to include a clutch slave cylinder case 22, the clutch slave piston 23 disposed in the cylinder hole of the cylinder case 22 so as to be fitted thereinto, and a spring 25 disposed in a clutch slave hydraulic chamber 24 defined by the clutch slave piston 23 in the cylinder hole and the cylinder case 22. The cylinder case 22 is formed with an inlet port 24a communicating with the clutch slave hydraulic chamber 24. The clutch slave cylinder 21 is configured such that the clutch slave hydraulic chamber 24 receives assist hydraulic pressure supplied from the inlet port 24a through an assist hydraulic line 47. If the clutch actuation hydraulic pressure is supplied to the clutch slave hydraulic chamber 24, the clutch slave piston 23 is pressed and moved in an axial direction, thereby pressing and moving the push rod 18 rightward in FIG. 3. As a result, the push rod 18 pushes and moves the pull rod 17 rightward to release the clutch mechanism CL. Incidentally, the spring 25 serves to eliminate the play of the push rod 18 while clutch hydraulic pressure is not supplied.

A description is next made of a configuration of a device which supplies assist hydraulic pressure to the assist hydraulic line 47. This device is configured to include an assist pressure generator 30 which generates assist pressure in response to the operation of the clutch lever 5. Incidentally, as shown in FIG. 2 the assist pressure generator 30 is attached to the main frame MF at a position inside the front cover FC.

The configuration and operation of the assist pressure generator 30 are described with additional reference to FIGS. 4 through 10. The assist pressure generator 30 includes an electric motor 31, a crankcase 32, a first turning angle sensor 39, a motor actuator 40 and a reservoir tank 45. The electric motor 31 is laterally disposed to be driven upon receipt of a drive signal from a control unit 90. The crankcase 32 has a crankshaft 34 rotatably driven by undergoing the rotary driving force of the electric motor 31 via an idler gear 33b. The first turning angle sensor 39 is disposed on the side of the electric motor 31 and not on the side of the crankcase 32. The motor actuator 40 is disposed to extend upward from the central portion of the crankcase 32. The reservoir tank 45 communicates with the motor actuator 40 via a pipe line 45a.

An idler shaft 33a and idler gears 33b, 33d are disposed below the crankshaft 34. The idler shaft 33a is secured to the crankcase 32 to extend almost horizontally. The idler gears 33b, 33d are rotatably carried on the idler shaft 33a via a bearing 33c. The idler gear 33b meshes with a gear portion 31b provided at the leading end of the rotary shaft 31a of the electric motor 31 extending almost horizontally. The idler gear 33d formed integrally with the idler gear 33b meshes with the gear portion 34g of the crankshaft 34. When the electric motor 31 rotates, the rotation driving force of the electric motor 31 is transmitted to the crankshaft 34 via the idler gears 33b, 33d.

The crankshaft 34 is composed of a drive crankshaft 34a and a driven crankshaft 34b. The drive crankshaft 34a is formed like the so-called crank-weight (a fan-like form), rotatably carried by a bearing 36a and has a gear part 34g meshing with the idler gear 33d. The driven crankshaft 34b has a fitting shaft 34c fitted to a fitting hole 34d formed in the drive crankshaft 34a to extend in the direction of the rotational axis thereof and rotatably carried by a bearing 36b.

Figure 6:
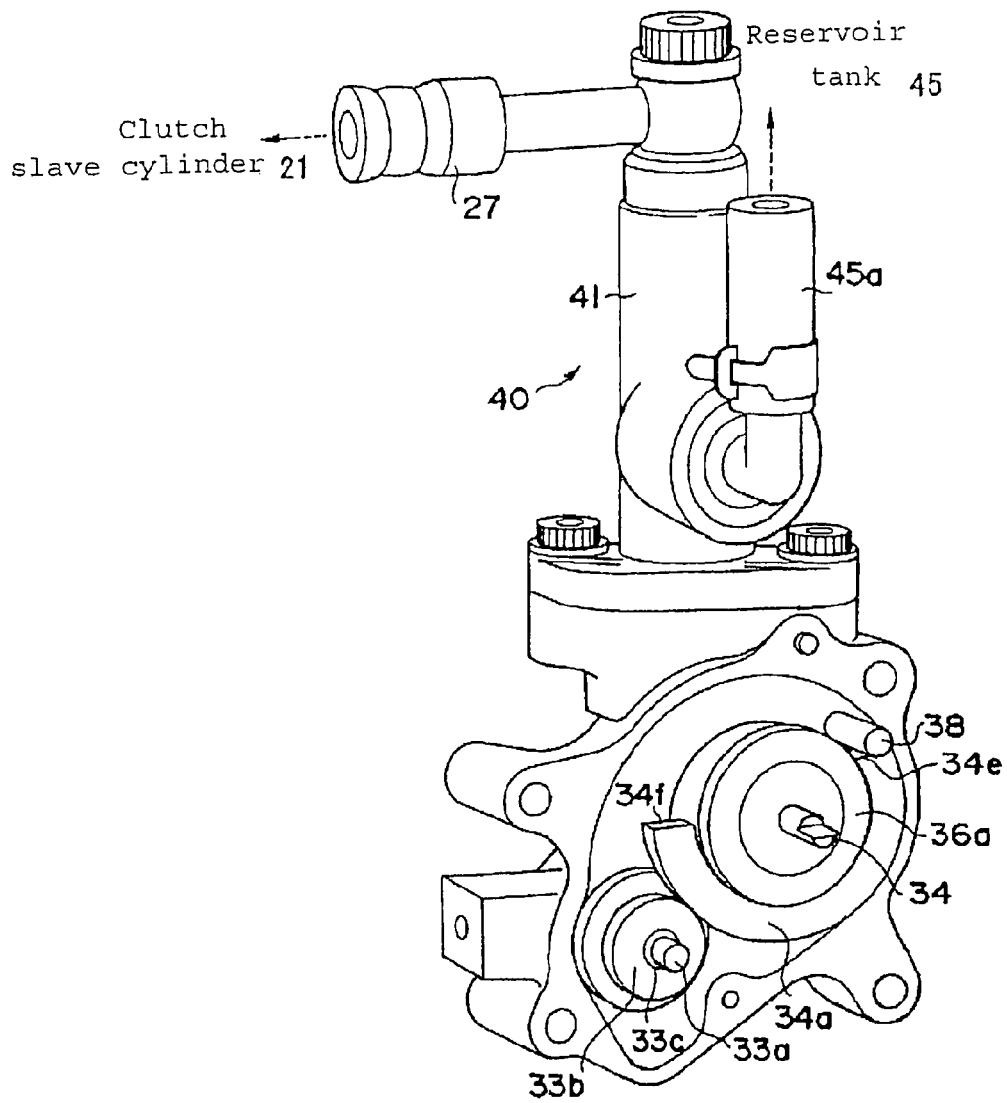
FIG. 6 is a perspective view illustrating the internal configuration of the motor actuator.
Figure 7:
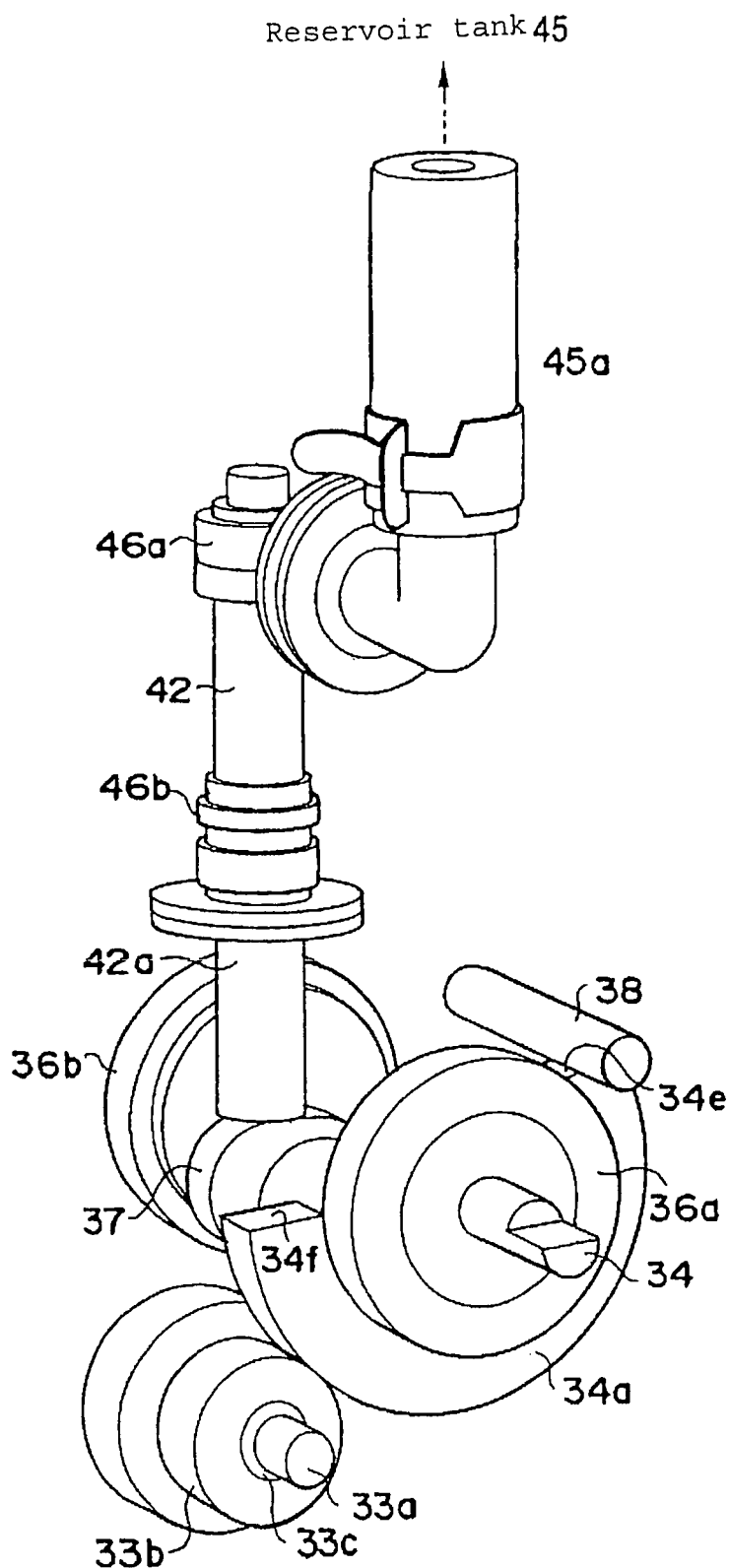
FIG. 7 is a perspective view illustrating the internal configuration of the motor actuator.
Figure 8:
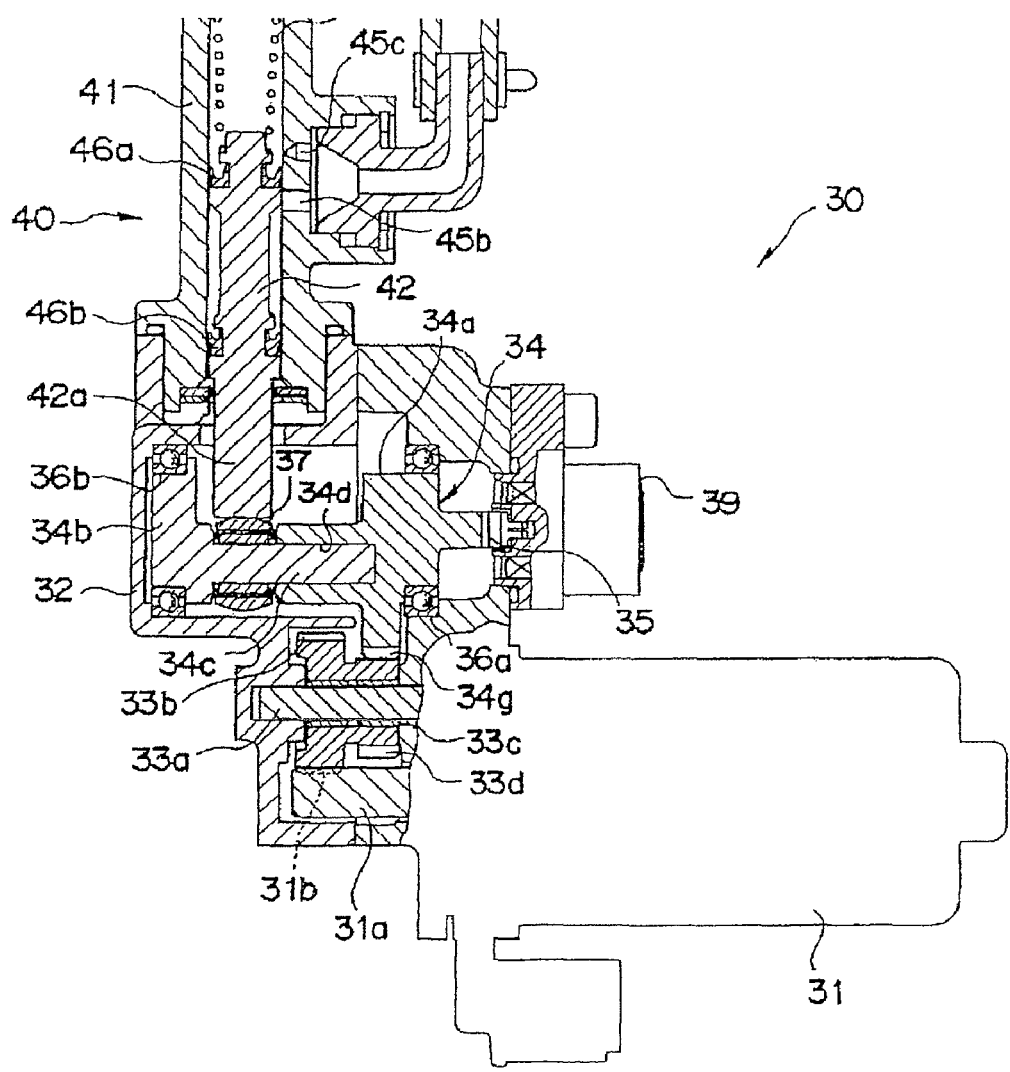
FIG. 8 is a cross-sectional view taken along line B-B of FIG. 4, illustrating the internal configuration of the motor actuator.

The first turning angle sensor 39 is attached to the drive crankshaft 34a on the side opposite to the side of the driven crankshaft 34b via a connector joint 35 for detecting the turning angle of the crankshaft 34. The fitting shaft 34c of the driven crankshaft 34b is in contact with the lower end of a piston rod 42a via a bearing 37. The piston rod 42a is integrally joined to a piston 42 constituting part of the motor actuator 40 and extends downward. As shown in FIGS. 6 and 7, an almost columnar stopper 38 is disposed to extend almost parallel to the rotational axis of the crankshaft 34. The drive crankshaft 34a is configured to turnably reciprocate between a position (see FIGS. 6 and 7) where its end face 34e comes into contact with the stopper pin 38 and a position where its end face 34f comes into contact with the stopper pin 38.

The motor actuator 40 is configured to include a cylinder case 41 and a depressing spring 44. The cylinder case 41 is integrally joined to the crankcase 32 and extends upward. The depressing spring 44 is disposed inside a hydraulic chamber 43 formed in the cylinder hole of the cylinder case 41 so as to be defined by the piston 42 and the cylinder case 41. The piston rod integrally joined to the piston 42 and extending downward has a lower end in contact with the driven crankshaft 34b. The reservoir tank 45 is connected to opening ports 45b, 45c at the intermediate portion of a cylinder case 41 via the pipe line 45a. Thus, the hydraulic oil in the reservoir tank 45 can be supplied into the cylinder hole via the opening ports 45b, 45c. A primary cup 46a is attached to an upper outer circumferential portion of the piston 42 so as to be in close contact therewith. Similarly, a secondary cup 46b is attached to a vertically-central outer circumferential portion of the piston 42 so as to be in close contact therewith. These primary and secondary cups 46a, 46b serve to prevent the hydraulic oil supplied from the reservoir tank 45 from leaking downward between the piston 42 and the inner wall of the cylinder case 41.

Figure 9:
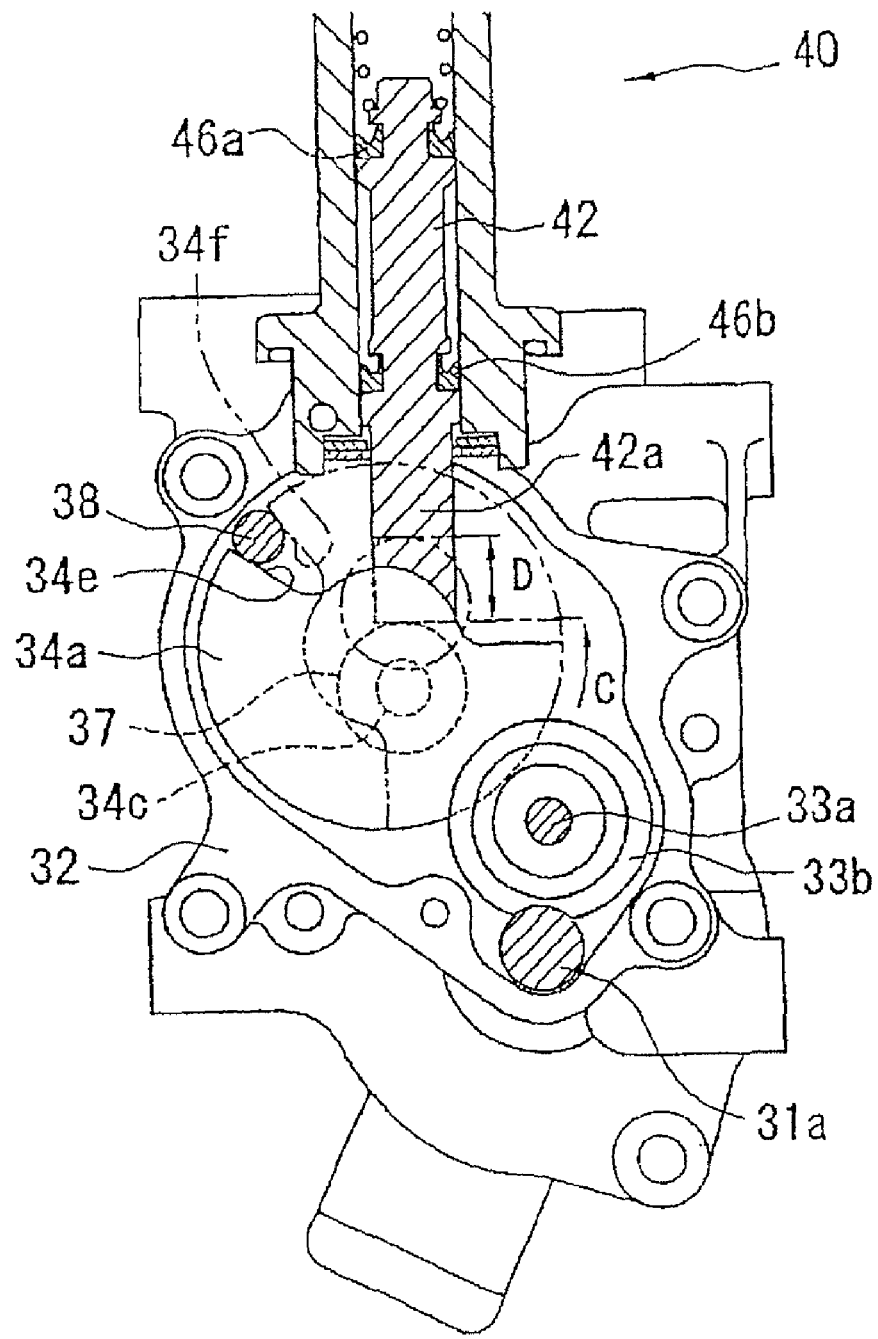
FIG. 9 is a cross-sectional view illustrating the internal configuration of the motor actuator.
Figure 10:
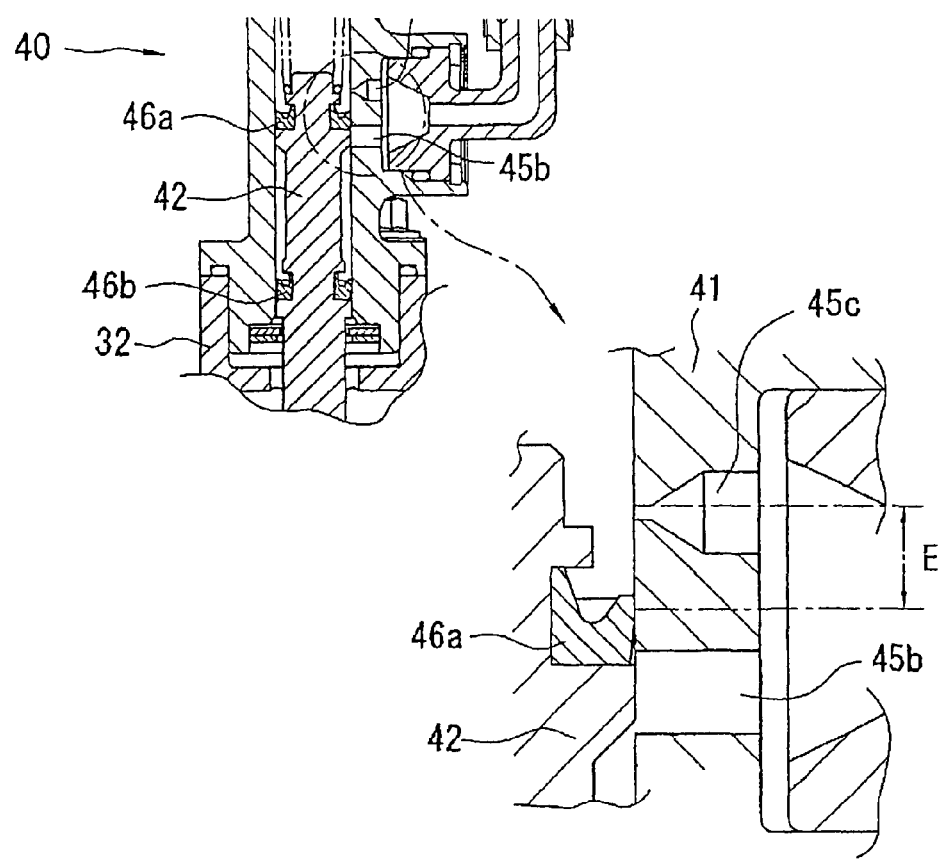
FIG. 10 includes a cross-sectional view illustrating the inner configuration of the motor actuator and an enlarged view illustrating the periphery of an opening port.

Further details are then described. In the state where the end face 34e of the crankshaft 34 is abutted against the stopper pin 38 as shown in FIG. 9, the piston rod 42a having the lower end in contact with the bearing 37 is located at its bottom dead point. In this state, the upper end of the seal surface of the primary cup 46a attached to the piston 42 is located on the lower side of the opening port 45c of the pipe line 45a and on the upper side of the opening port 45b, so that the hydraulic chamber 43 communicates with the reservoir tank 45 via the pipe line 45a (see FIG. 10). Thus, the hydraulic oil in the reservoir tank 45 is supplied to the hydraulic chamber 43.

Upon receipt of a drive signal from the control unit 90, the electric motor 31 is driven to turn the drive crankshaft 34a in the direction of arrow C in FIG. 9 and the end face 34f of the drive crankshaft 34a is abutted against the stopper pin 38

(indicated with a two-dot chain line). The piston rod 42a having the lower end abutted against the bearing 37 moves upward against the biasing force of the depressing spring 44 and is located at its upper dead point higher by a length of D than the lower dead point. This upward movement causes the upper end of the piston 42 to pass and close the opening port 45c and allows the hydraulic oil in the hydraulic chamber 43 to be compressed and increased in pressure according to the upward movement of the piston 42.

Until the upward movement of the piston 42 allows the close contact portion of the primary cap 46a with the cylinder case 41 to pass the opening port 45c, a portion of the hydraulic oil flows out to the pipe line 45a via the opening port 45c. Therefore, the hydraulic oil in the hydraulic chamber 43 is moderately increased in pressure and sharply increased in pressure after the close contact portion has passed the opening port 45c. In other words, as shown in the enlarged view of FIG. 10, the length E is a no-effect stroke of the piston 42. In this way, the hydraulic oil in the hydraulic chamber is compressed to increase in pressure and supplied to the clutch actuator 20 via the assist hydraulic line 47.

In this state, upon receipt of a drive signal from the control unit 90, the electric motor 31 is reversely rotated to turnably drive the drive crankshaft 34a in the direction opposite to the direction of arrow C. The piston 42 is moved downward by biasing force of the depressing spring 44 and returned to the bottom dead point. In short, when the electric motor 31 is driven to turn the drive crankshaft 34a in the direction of arrow C and in the direction opposite to the direction of arrow C, the piston 42 moves upward and downward in the stroke of length D in FIG. 9. Thus, the hydraulic oil in the hydraulic chamber 43 is supplied to the clutch actuator 20 via the assist hydraulic line 47 and the hydraulic oil in the reservoir tank 45 is supplied to the hydraulic chamber 43.

A description is next made of the configuration of a clutch lever 5 and peripherals thereof adapted to actuate the pull rod 17 described above to release the clutch mechanism CL with reference to FIGS. 11 through 14.

Figure 11:
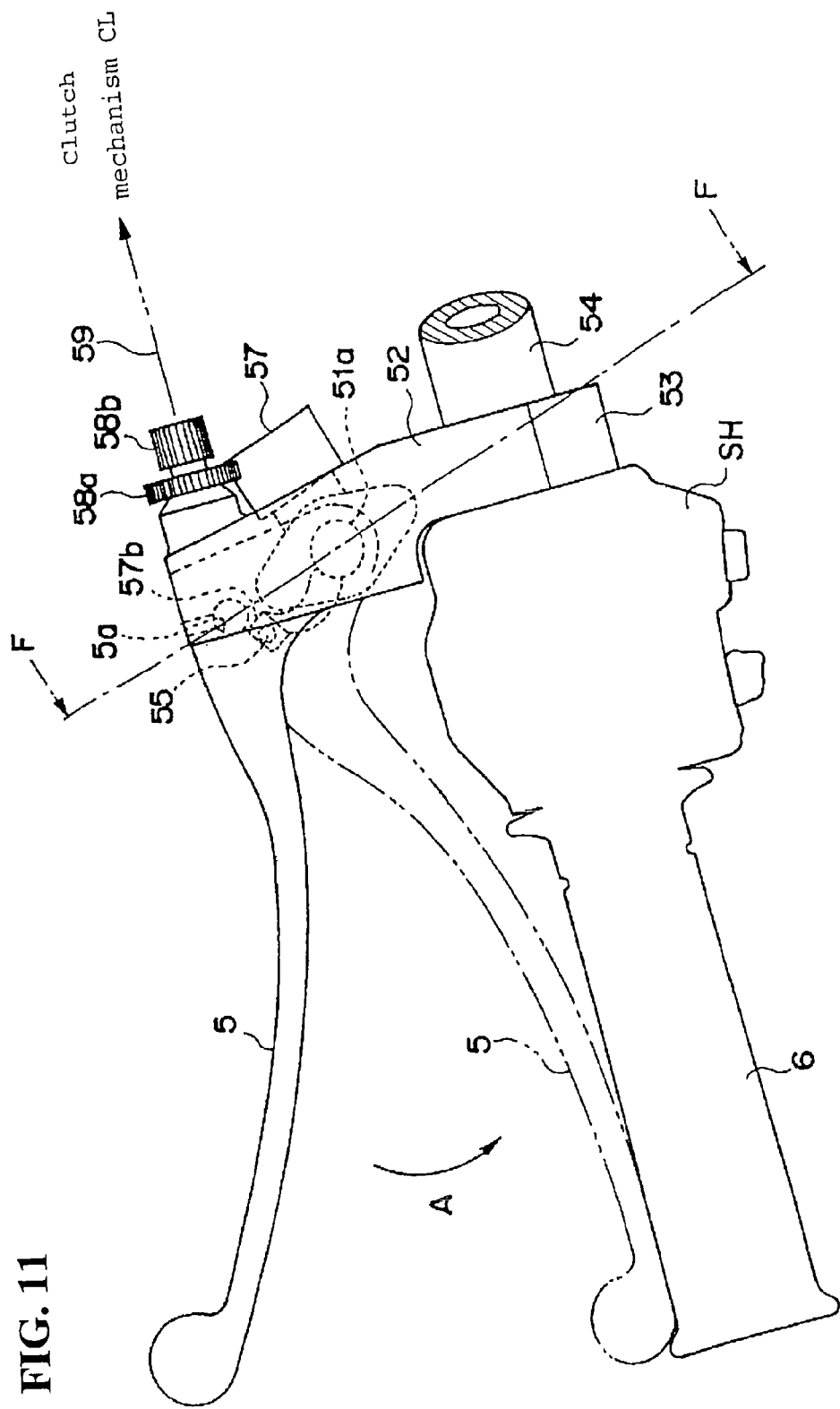
FIG. 11 is a plan view illustrating a clutch lever and its peripherals constituting part of the clutch device.

The clutch lever 5 is attached to a clutch lever bracket 52 so as to be turnable around a clutch lever pivot 51a. The clutch lever bracket 52 is fastened at its proximal end to a bracket attachment holder 53 in such a manner that the clutch lever bracket 52 and bracket attachment holder 53 grip the handlebar pipe 54 therebetween with attachment bolts 56. The clutch lever 5 is configured to be turned in a direction of arrow A in FIG. 11 by a rider operatively griping it with his or her hand. If the clutch lever 5 in a state indicated with a solid line in FIG. 11 is turned in the direction of arrow A around the clutch lever pivot 51a, it comes close to the left hand grip portion 6 as indicated with a two-dot chain line in FIG. 11.

The clutch lever 5 is formed at the proximal portion thereof with an inward recessed cable attachment portion 5a used to connect the end of the clutch cable 59 with the clutch cable 5. The clutch cable 59 having the end connected with the cable attachment portion 5a is passed through a fixation screw 58a and an adjustment screw 58b and joined to the clutch cable attachment member 81 on the side of the transmission TM described above. Thus, if the clutch lever 5 is turned in the direction of arrow A, the clutch cable 59 is pulled to turn the clutch arm 83 (see FIG. 3) attached with the clutch cable attachment member 81. The mechanism described above can release the clutch mechanism CL. The fixation screw 58a retains the clutch cable 59 adjusted by the adjustment screw 58b in the adjusted state. If the adjustment screw 58b is turned with the fixation screw 58a untightened, the amount of turning the clutch lever 5 until the turning of the clutch arm 83 is started when the clutch lever 5 is turned in the direction of arrow A can be adjusted. In other words, the amount of play of the clutch lever 5 until the clutch mechanism CL starts the releasing actuation can be adjusted by using the adjustment screw 58b.

Figure 12:
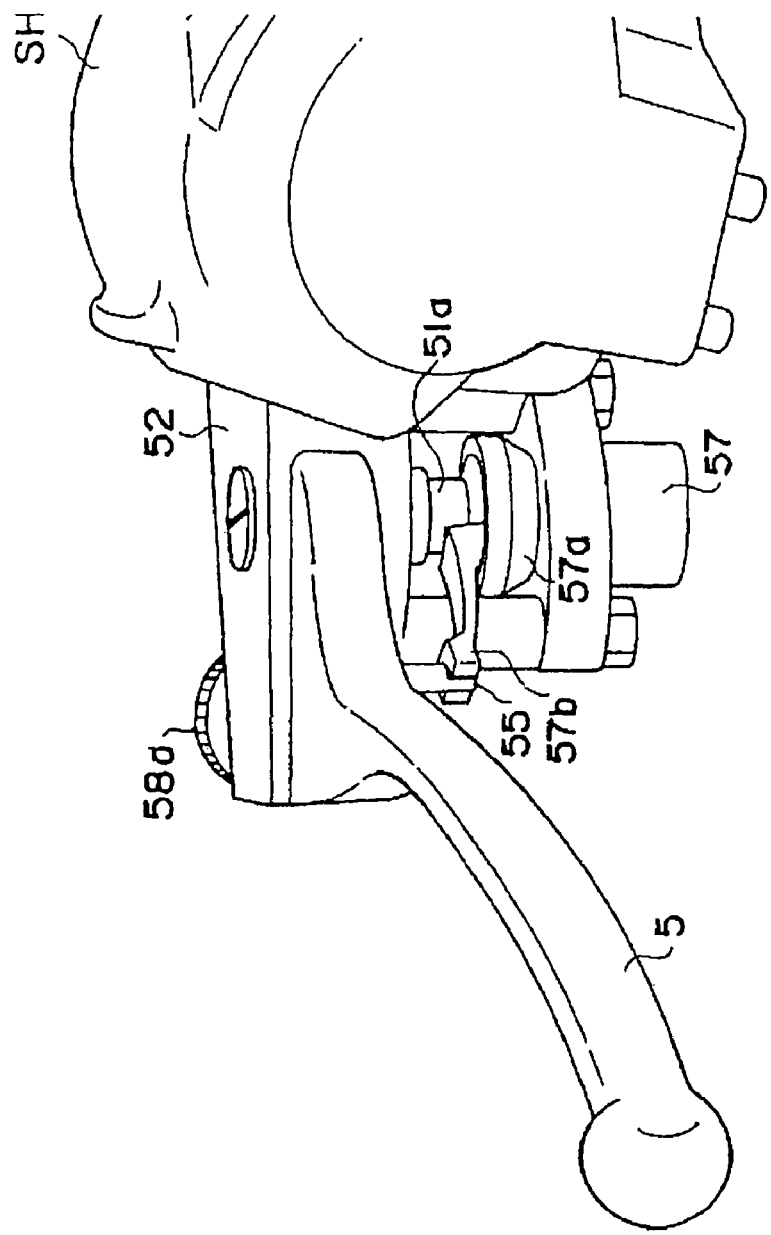
FIG. 12 is a perspective view illustrating the clutch lever and its peripherals.
Figure 13:
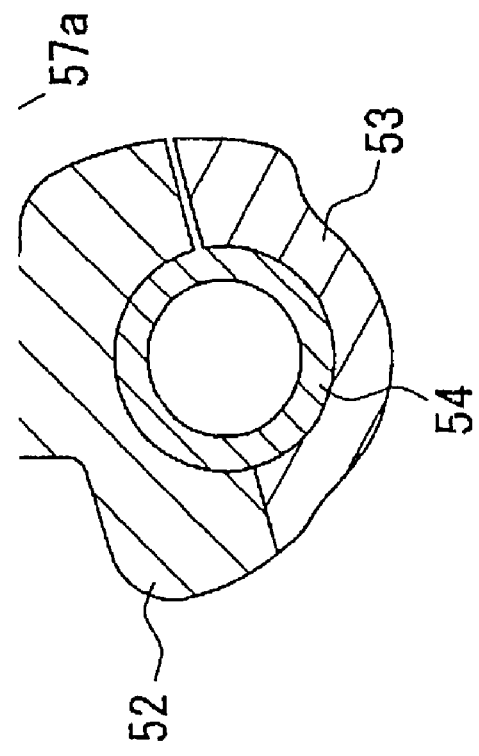
FIG. 13 is a cross-sectional view taken along line F-F of FIG. 11, illustrating the inner structure of the clutch lever and its peripherals.
Figure 14:
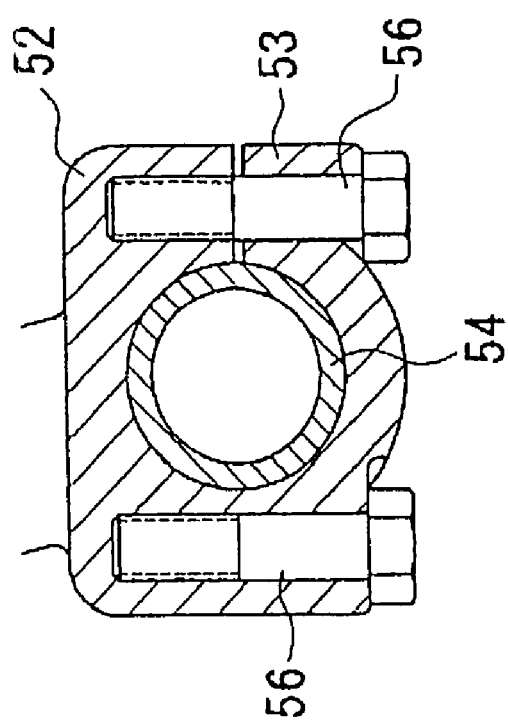
FIG. 14 is a cross-sectional view illustrating the internal structure of the clutch lever and its peripherals.
Figure 15:
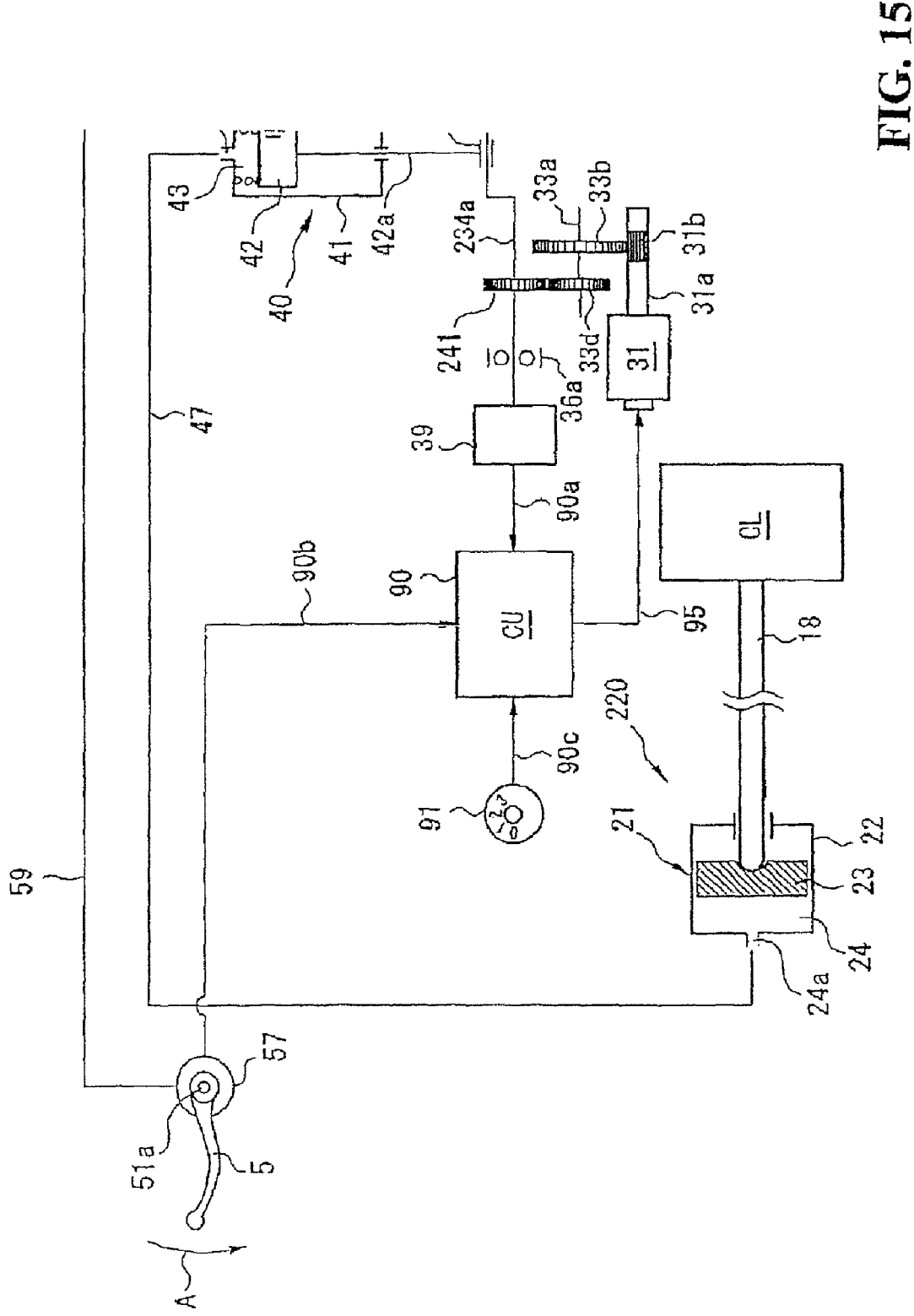
FIG. 15 is a schematic illustrating the entire configuration of a clutch mechanism according to a second embodiment of the present invention.

Referring to FIG. 12, a second angle sensor 57 is attached to the lower end of the clutch lever pivot 51a coaxially therewith. A turning arm 57b is integrally attached to a turning portion 57a of the second angle sensor 57. The turning arm 57b is engaged with an almost columnar engagement rod 55 which is press fitted to the clutch lever 5 and projects downward from the lower surface of the clutch lever 5. Thus, if the clutch lever 5 is operated to turn around the clutch lever pivot 51a, similarly the turning portion 57a turns via the engaging rod 55 and the turning arm 57b engaged therewith. Consequently the second turning angle sensor 57 can detect the operation angle of the clutch lever 5 (the turning amount of the clutch lever 5).

Figure 1:
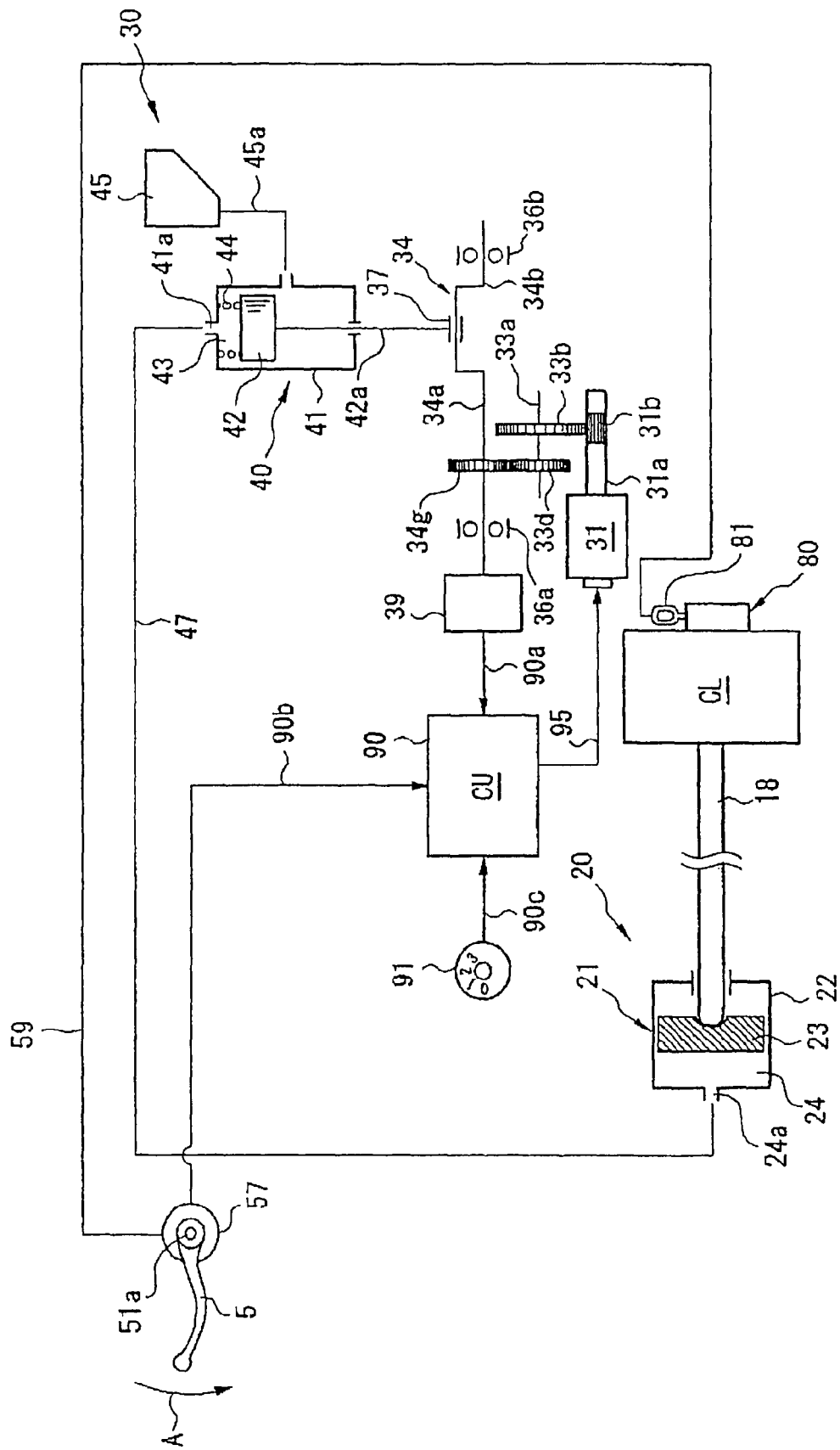
FIG. 1 is a schematic illustrating the entire configuration of a clutch mechanism according to the present invention.

With the configuration described above, referring to FIG. 1, the drive of the electric motor 31 is controlled based on a control signal sent from the control unit 90 via a drive control line 95. To exercise the control, the control unit 90 receives a detection signal of a turning angle of the crankshaft 34 and a clutch lever operation angle signal which are sent from the first turning angle sensor 39 and from the second turning angle sensor 57 via signal lines 90a and 90b, respectively. An assist force setting knob 91 is disposed at a position where the rider of the motorcycle can operate the knob 91. The knob 91 is manually operated to set the assist force generated by the motor actuator 40 at four stages of 0 to 3. Also the assist force setting signal is sent to the control unit 90 via a signal line 90c. The assist force setting is designed such that no assist force is applied at "0-level" and the assist force is increased stepwise from a "1-level" to a "3-level".

The actuation along with the operation of the clutch lever 5 is described in the clutch device configured as described above. The operation is first described when the assist force setting knob 91 is set at the "0-level", that is, when setting of applying no assist force is performed.

If the clutch lever 5 is operated to turn in the direction of arrow A at this setting level, the turning angle of the clutch lever 5 is detected by the second turning angle sensor 57 and the detected signal information is sent to the control unit 90 via the signal line 90b. In this case, also the "0-level" signal is sent to the control unit 90 from the assist force setting knob 91 via the signal line 90c. Therefore, the control unit 90 will neglect the turning angle signal of the clutch lever 5 even if receiving this turning signal. In addition, the control unit 90 will not send a drive signal to the electric motor 31 via the drive signal line 95 so that the motor 31 is retained in a stationary state. Thus, hydraulic pressure will not be supplied from the motor actuator 40 to the clutch slave cylinder 21 so that the clutch slave piston 23 may undergo the biasing force of the spring 25 to be retained in a leftward moved state.

The clutch lever 5 is operated to pull the clutch cable 59, which turns the clutch arm 83, thereby turning the shaft member 84. The shaft member 84 is turned to pull the pull rod 17, thereby releasing the clutch mechanism CL. In this way, in the state where the "0-level" is set by the assist force setting knob 91, the clutch mechanism CL is released only by the operating force of the rider who turnably operates the clutch lever 5. In short, it is possible to release the clutch mechanism CL without actuation of and independently of the electric motor 31, thereby interrupting the power transmission from the engine.

A description is next made of operation performed at any one of the "1-3 levels" set by the assist force setting knob 91. If the clutch lever 5 is operated at this level to turn in the direction of arrow A, as with the case of setting the "0-level", the pull rod 17 is pulled to release the clutch mechanism CL by the operating force of the rider who turnably operates the clutch lever 5. While the clutch lever 5 is turned in the direction of arrow A, the second turning angle sensor 57 detects its turning angle and sends the detection information signal to the control unit 90. At this time, the control unit 90, in response to the turning angle signal thus received of the clutch lever 5, sends a drive signal to the electric motor 31 for rotational driving. Thus, the crankshaft 34 described above is rotationally driven to supply the assist hydraulic pressure to the clutch slave cylinder 21 from the motor actuator 40.

At this time, the first turning angle sensor 39 detects the turning angle of the crankshaft 34 and sends the detection signal to the control unit 90 via the signal line 90a. Upon receipt of the signal, the control unit 90 calculates the actual turning angle position of the crankshaft 31 and executes the drive correction on the electric motor 31. More specifically, the control unit 90 uses the signal from the first angle sensor 39 as feedback information to exercise the drive control on the electric motor 31 so that the accurate assist force may be provided in accordance with the operation of the clutch lever 5.

In this way, if the electric motor 31 is driven to supply the assist hydraulic pressure to the clutch slave cylinder 21 from the motor actuator 40, the clutch slave piston 23 receives the assist hydraulic pressure and moves rightward in FIG. 3 to press the push rod 18 rightward. This pressing force acts as a force that assists the operation of the clutch lever 5, thus reducing the operation force of the clutch lever 5 operated by the rider. In this case, the control unit 90 changes the drive control content of the electric motor 31 in accordance with the setting level and executes the gain adjustment of the assist force according to the operation of the clutch lever 5. Specifically, the drive control of the electric motor 31 is exercised so that at setting level 1 the gain is made small to make the assist force relatively small and at setting level 3 the gain is made large to make the assist force large.

A second embodiment of the present invention is next described with reference to FIGS. 15 through 23. A portion different from the first embodiment is mainly described here. To release a clutch mechanism CL of the present embodiment, similarly to with the first embodiment, a pressing member 15 is moved in a direction (the rightward direction in FIG. 17) opposite to the biasing direction of a pressing spring 16 to release the force pressing separator plates 13 and friction plates 14 with each other, thereby releasing the frictional engagement therebetween. However, the configuration of the second embodiment to execute this operation is different from that of the first embodiment.

The configuration to move the pressing member 15 is as below. A receiving member 217 is disposed at the inner circumferential portion of the pressing member 15 via the bearing 17a. A push rod 18 is disposed to extend in a communication hole 2a which passes through an input shaft 2 along the central axis thereof. A leading end of the push rod 18 is abutted against a receiving member 217 disposed coaxially with the longitudinally axial direction of the push rod 18. The proximal portion of the push rod 18 is abutted against a clutch slave piston 23 constituting part of a clutch slave cylinder 21. The configuration composed of the clutch slave cylinder 21, the push rod 18, and the receiving member 217 is called a clutch actuator 220.

Unlike the first embodiment, the clutch mechanism of the present embodiment is not provided with components such as the shaft member 84 and the pull rod 17 which are connected to the clutch cable 59. The clutch mechanism CL is not provided with the clutch cable 59 extending from the clutch lever 5. In the present embodiment, the clutch cable 59 is connected to a clutch cable attachment member 281 attached to the end side of a driven crankshaft 234 described later.

The clutch slave cylinder 21 has the same configuration as that of the first embodiment. The clutch slave hydraulic chamber 24 receives therein assist hydraulic pressure supplied from the inlet port 24a of the clutch slave cylinder case 22 via the assist hydraulic line 47. If the clutch hydraulic pressure is supplied to the inside of the clutch slave hydraulic chamber 24, the clutch slave piston 23 is axially pressed and moved to press and move the push rod 18 rightward in FIG. 17. As a result, the push rod 18 presses and moves the receiving member 217 rightward to release the clutch mechanism CL.

Figure 16:
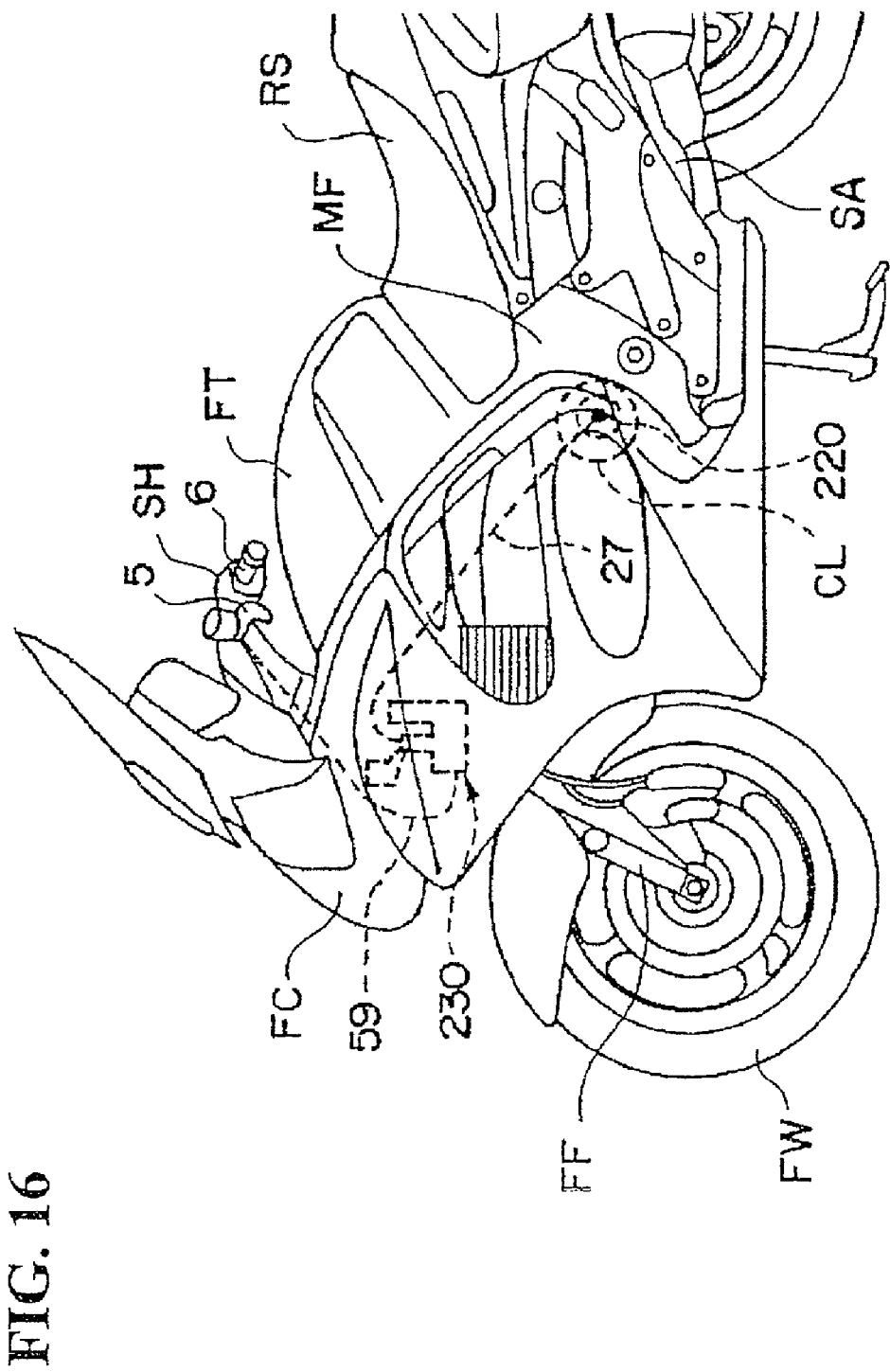
FIG. 16 is a lateral view illustrating the entire external appearance of a motorcycle equipped with the clutch device of the second embodiment.

A description is next made of the configuration of a device which supplies assist hydraulic pressure to an assist hydraulic line 47. This device includes an assist pressure generator 230 which generates assist pressure in response to the operation of the clutch lever 5. Incidentally, as shown in FIG. 16 the assist pressure generator 230 is attached to the main frame MF at a position inside the front cover FC.

The assist pressure generator 230 includes an electric motor 31, a crankcase 32, a first turning angle sensor 39, a motor actuator 40 and a reservoir tank 45. The electric motor 31 is laterally disposed to be driven upon receipt of a drive signal from a control unit 90. The crankcase 32 has a crankshaft 234 rotatably driven by undergoing the rotary driving force of the electric motor 31 via an idler gear 33b and drive gear 241. The first turning angle sensor 39 is disposed on the side of the electric motor 31 opposite to the side of the crankcase 32. The motor actuator 40 is disposed to extend upward from the central portion of the crankcase 32. The reservoir tank 45 communicates with the motor actuator 40 via a pipe line 45a.

Below the crankshaft 234 there are provided an idler shaft 33a and idler gears 33b, 33d rotatably carried by the idler shaft 33a via a bearing 33c. The idler shaft 33a is secured to the crankcase 32 to extend almost horizontally. The idler gear 33b meshes with a gear portion 31b provided at the leading end of the rotational shaft 31a of the electric motor 31 extending almost horizontally. The idler gear 33d formed integrally with the idler gear 33b meshes with a drive gear 241.

A one-way clutch 240 is fitted into the inner circumference of the drive gear 241. The crankshaft 234 includes a drive crankshaft 234a and a driven crank shaft 234b. The drive crankshaft 234a is fitted to the inner circumference of the one-way clutch 240 so as to be rotatably carried by a bearing 36a. The driven crankshaft 234b includes a fitting shaft 234c and is rotatably carried by a bearing 36b. The fitting shaft 234c is fitted into a fitting hole 234d which is formed in the drive crankshaft 234a so as to extend in the direction of the rotational axis thereof. The drive crankshaft 234a is formed with two stopper surfaces 234e, 234f which project in a radial direction.

The one-way clutch 240 restricts the drive crankshaft 234a from relatively rotating in the direction opposite to the rotational direction of the drive gear 241 and permits it from relatively rotating in the same direction as the rotational direction of the drive gear 241. Thus, if the electric motor 31 rotates, its rotational drive force is transmitted to the drive gear 241 via the idler gears 33b, 33d so that the one-way clutch 240 integrally rotates the drive gear 241 and the drive crankshaft 234a. In short, the drive force of the electric motor 31 is transmitted therefrom to the side of the drive crankshaft 234a. On the other hand, the drive crankshaft 234a is permitted to relatively rotate in the same direction as the rotational direction of the drive gear 241. Therefore, the drive crankshaft 234a freely rotates (lost motion) with respect to the drive gear 241 so that the drive force is not transmitted from the side of the drive crankshaft 234a to the side of the electric motor 31.

Figure 20:
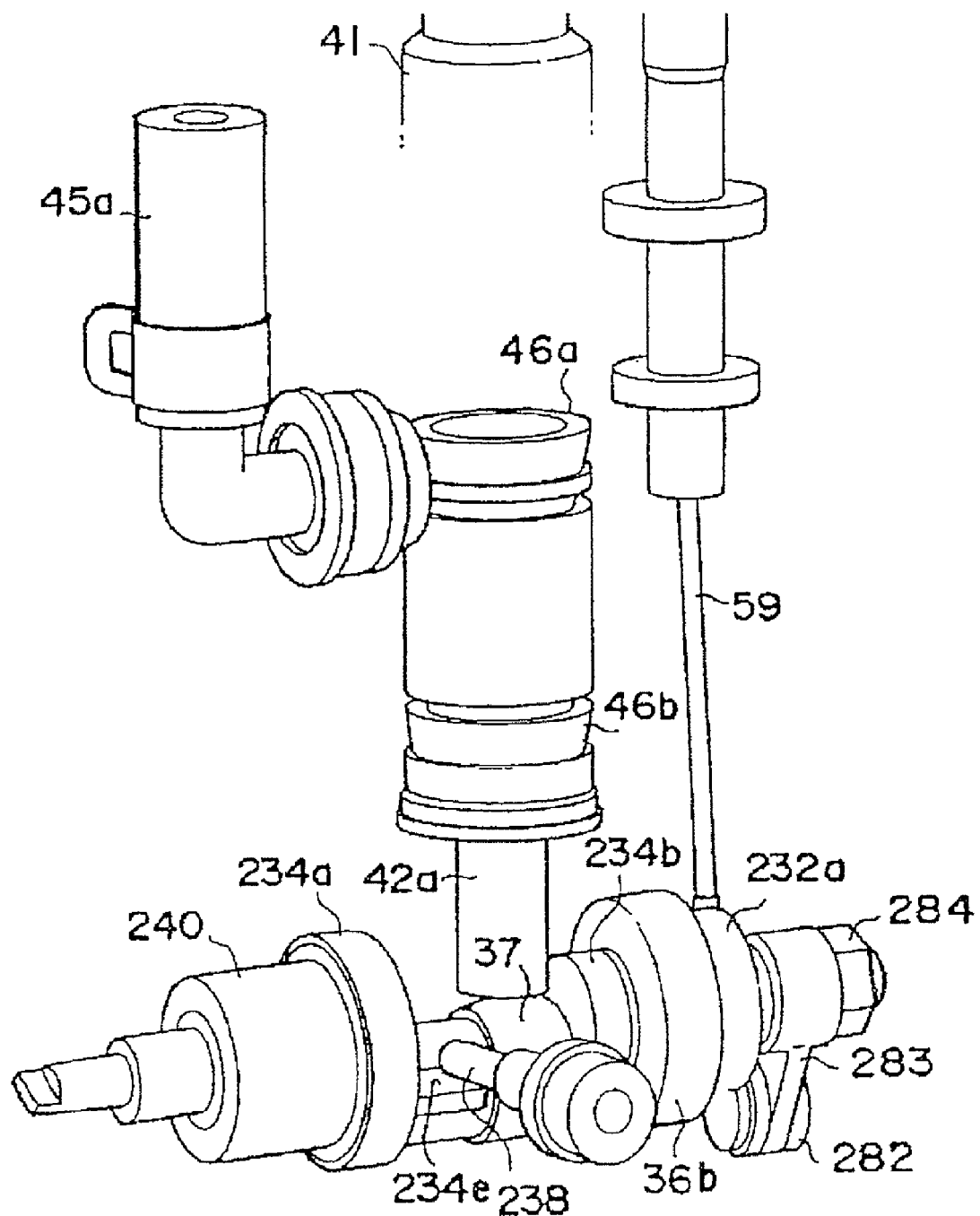
FIG. 20 is a perspective view illustrating the internal configuration of the motor actuator according to the second embodiment.
Figure 21:
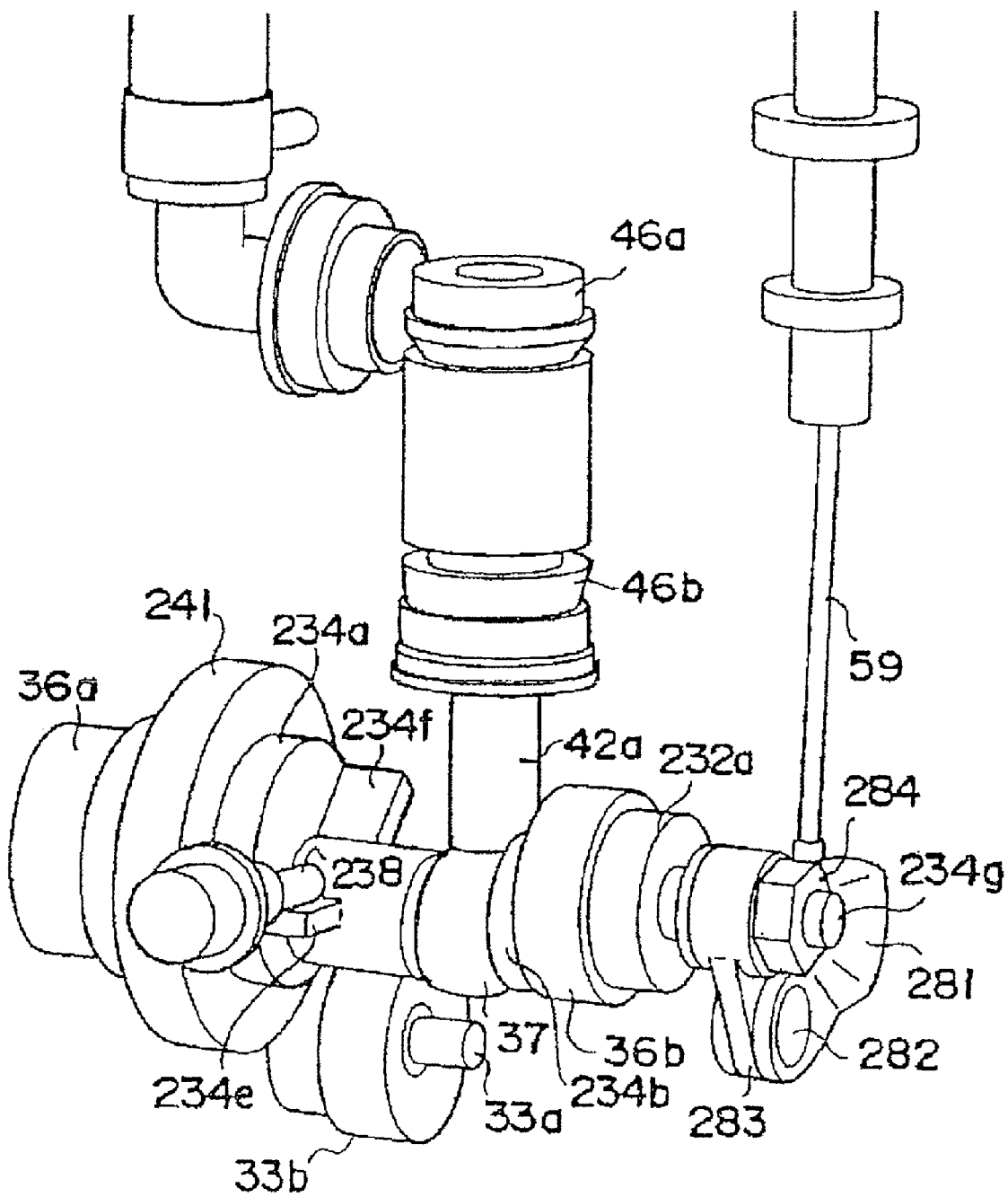
FIG. 21 is a perspective view illustrating the internal configuration of the motor actuator according to the second embodiment.
Figure 22:
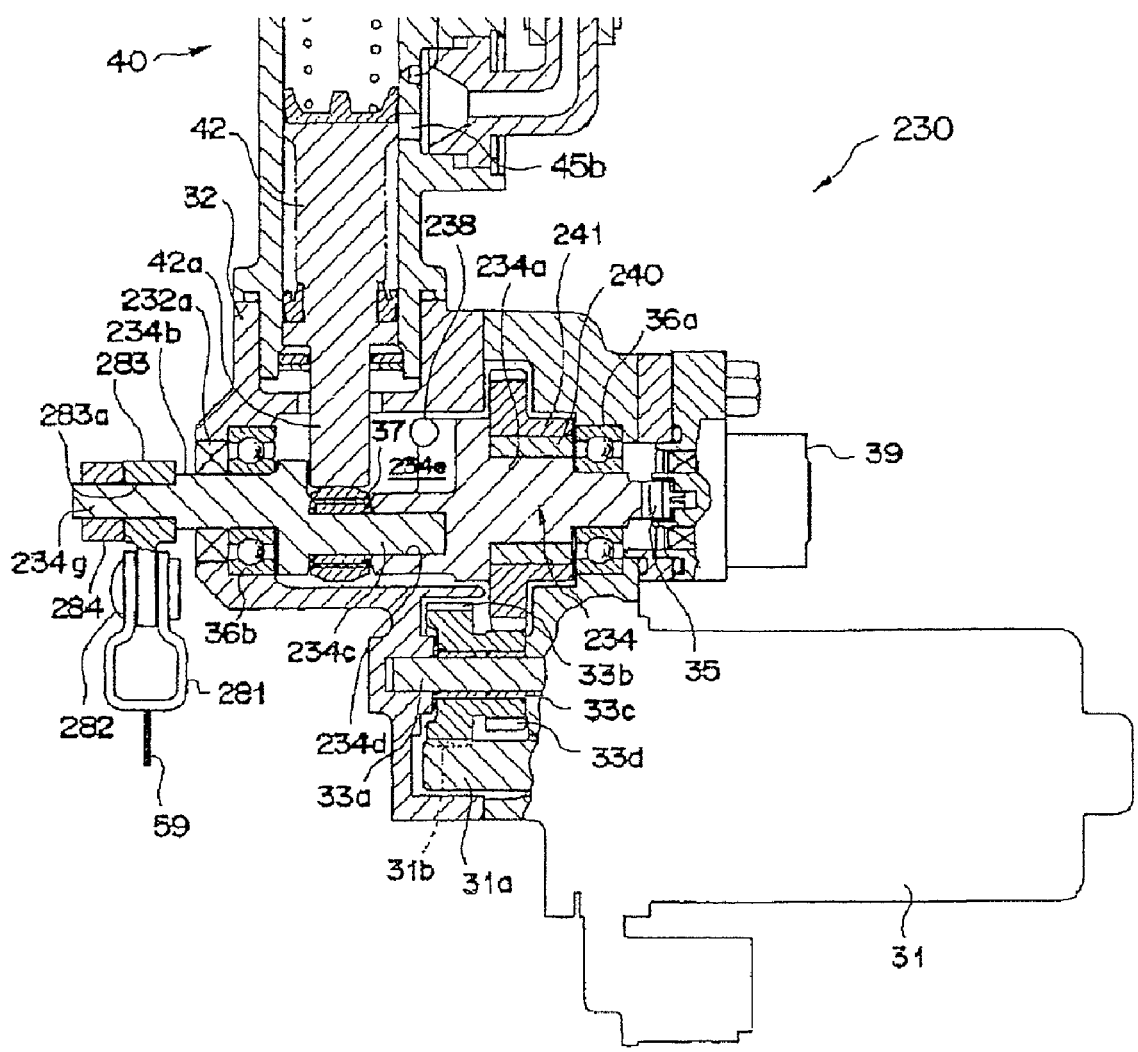
FIG. 22 is a cross-sectional view taken along line G-G of FIG. 18, illustrating the internal configuration of the motor actuator according to the second embodiment.

A first turning angle sensor 39 is attached to the drive crankshaft 234a via a connector joint 35 on the side opposite to the side of the driven crankshaft 234b. This sensor 39 detects the turning angle of he crankshaft 234. The lower end of the piston rod 42a is abutted against the fitting shaft 234c of the driven crankshaft 234b via a bearing 37. The piston rod 42a is integrally joined to the piston 42 constituting part of a motor actuator 40 so as to extend downward. Referring to FIGS. 20 and 21, an almost columnar stopper pin bolt 238 is disposed to extend almost horizontally from the outer circumferential side of the drive crankshaft 234a toward the rotational axis of the drive crankshaft 234a. The drive crankshaft 234a is configured to enable reciprocative rotational movement between a position (see FIGS. 20 and 21) where its stopper surface 234e comes into abutment against the stopper pin bolt 238 and a position where the stopper surface 234f comes into abutment against the stopper pin bolt 238.

The driven crankshaft 234b extends through a dust seal 232 to the outside of the crankcase 32. The dust seal 232 is adapted to prevent the entry of foreign matter from the outside. An arm fitting portion 234g of the driven crankshaft 234b extending to the outside of the crankcase 32 is insertably fitted into a fitting-insertion hole 283a of a lever arm 283. A fixation nut 284 is provided at the end of the arm fitting portion 234g so that the lever arm 283 fitted to the arm fitting portion 234g is prevented from coming out of the arm fitting portion 234g. Consequently, the driven crankshaft 234b is turned integrally with the turning lever arm 283. The clutch cable attachment member 281 is attached to the leading end of the lever arm 283 with an attachment pin 282. An end of the clutch cable 59 extending from the clutch lever 5 is attached to the clutch cable attachment member 281. When the clutch cable 59 is pulled to turn the lever arm 283 together with the clutch cable attachment member 281, the driven crank shaft 234b simultaneously turns in the same direction as the turning direction of the clutch cable attachment member 281.

Similarly to the first embodiment, the motor actuator 40 is configured such that the piston rod 42a is integrally joined to the piston 42 so as to extend downward and has the lower end abutted against the driven crankshaft 234b. The reservoir tank 45 is connected to the opening ports 45b, 45c at the intermediate portion of a cylinder case 41 via the pipe line 45a. Thus, the hydraulic oil in the reservoir tank 45 can be supplied into the cylinder hole via the opening ports 45b, 45c.

If the clutch cable 59 is pulled to turn the driven crankshaft 234b via the lever arm 283, the piston 42 is moved upward against the biasing force of the depressing spring 44, so that the hydraulic oil in the hydraulic chamber 43 is supplied to the clutch actuator 20 via the assist hydraulic line 47. If the hydraulic oil is supplied to the clutch actuator 20, the receiving member 217 moves rightward in FIG. 17 to move the pressing member 15 against the biasing force of the pressing spring 16, thereby releasing the clutch mechanism CL.

Figure 23B:
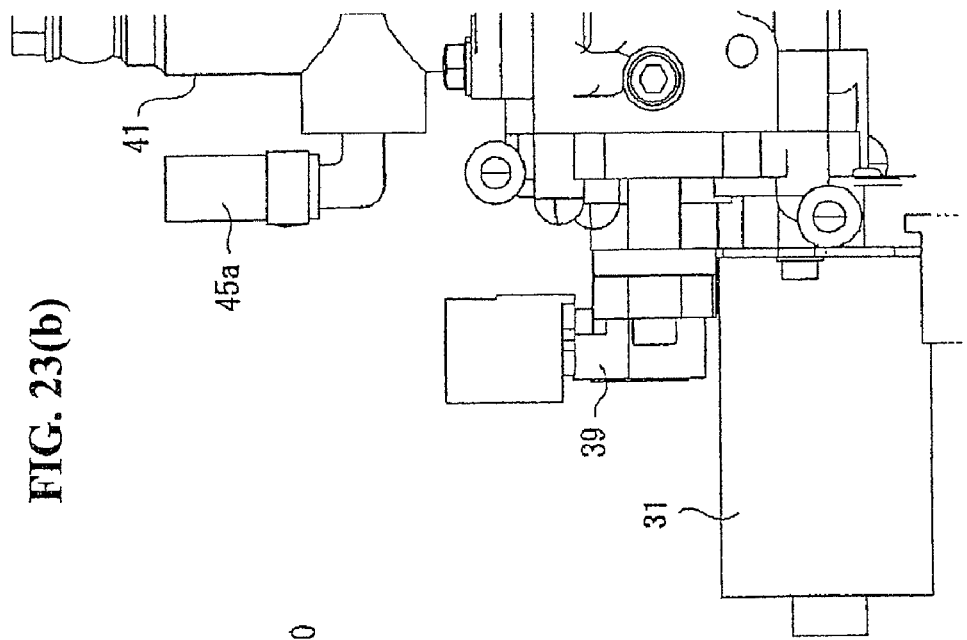
FIG. 23(*a*) is a cross-sectional view illustrating the internal configuration of the motor actuator according to the second embodiment and FIG. 23(*b*) is a lateral view of the motor actuator.
Figure 23A:
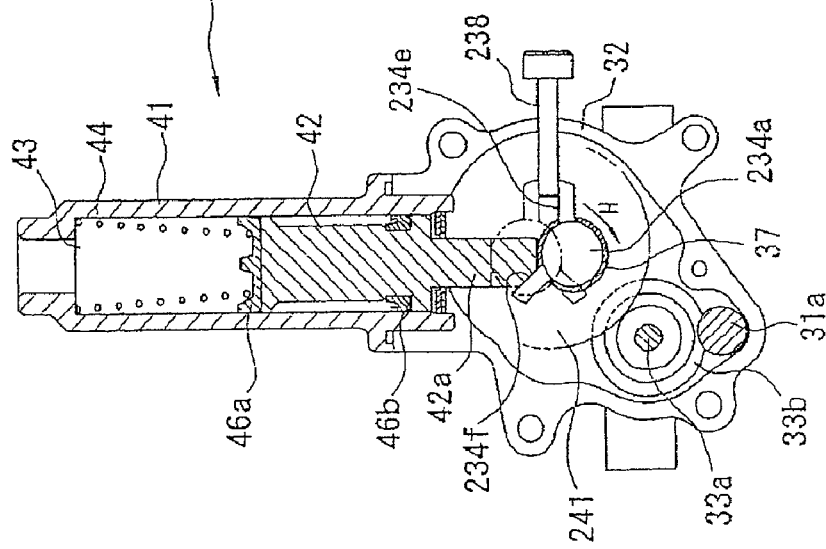

Referring to FIG. 23(a), in a state where the stopper surface 234e of the drive crankshaft 234 is abutted against the stopper pin bolt 238, the piston rod 42a having a lower end abutted against the bearing 37 is located at its top dead point. In this state, the upper end of the seal surface of the primary cup 46a attached to the piston 42 is located on the lower side of the opening port 45c of the pipe line 45a and on the upper side of the opening port 45b, so that the hydraulic chamber 43 communicates with the reservoir tank 45 via the pipe line 45a. Thus, the hydraulic oil in the reservoir tank 45 is supplied to the hydraulic chamber 43.

Upon receipt a drive signal from the control unit 90, the electric motor 31 is driven to turn the drive crankshaft 234a in the direction of arrow H in FIG. 23(a). The stopper surface 234f of the drive crankshaft 234a comes into abutment against the stopper pin bolt 238 (indicated with a two-dotted chain line in FIG. 23(a)). Then the piston rod 42a having the lower end abutted against the bearing 37 is moved upward against the biasing force of the depressing spring 44, reaching its upper dead point. This upward movement allows the upper end of the piston 42 to pass and close the opening port 45c. The hydraulic oil in the hydraulic chamber 43 is compressed and increased in pressure in response to the upward movement of the piston 42. In this way, if the hydraulic oil in the hydraulic chamber 43 is compressed, the hydraulic oil in the hydraulic chamber 43 is supplied to the clutch actuator 20 via the assist hydraulic line 47.

Further in this state, upon receipt a drive signal from the control unit 90, the electric motor 31 is reversely driven to rotationally drive the drive crankshaft 234a in the direction opposite to arrow H, the piston 42 is moved downward by the biasing force of the depressing spring 44 to return to the lower dead point. In short, if the electric motor 31 is driven to turn the drive crankshaft 234a in the direction of arrow H and in the direction opposite to the direction of arrow H, the piston 42 moves upward and downward by a length J as one stroke. In this way, the hydraulic oil in the reservoir tank 45 is supplied into the hydraulic chamber 43 and the hydraulic oil in the hydraulic chamber 43 is supplied to the clutch actuator 20 via the assist hydraulic line 47.

Incidentally, the configuration of the clutch lever 5 and peripherals thereof operated to release the clutch mechanism CL by operating the receiving member 217 as described above is the same as that in the first embodiment.

With the configuration described above, as shown in FIG. 15, the drive of the electric motor 31 is controlled based on a control signal supplied from the control unit 90 via the drive control line 95. To exercise this control, the control unit 90 receives a turning angle detection signal of the crankshaft 234 from the first turning angle sensor 39 and a clutch lever operating angle signal from the secondary turning angle sensor 57 sent via the signal lines 90a and 90b, respectively. Similarly to the first embodiment, the assist force setting knob 91 is manually operated to set the assist force generated by the motor actuator 40 at four stages, 0 to 3 stages.

The actuation along with the operation of the clutch lever 5 is described in the clutch device configured as described above. The actuation is first described when the assist force setting knob 91 is set at "0-level", that is, when setting of applying no assist force is performed.

If the clutch lever 5 is operated to turn in the direction of arrow A at this setting level, the turning angle of the clutch lever 5 is detected by the second turning angle sensor 57 and the detected signal information is sent to the control unit 90 via the signal line 90b. In this case, also the "0-level" signal is sent to the control unit 90 from the assist force setting knob 91 via the signal line 90c. Therefore, the control unit 90 will neglect the turning angle signal of the clutch lever 5 even if receiving this rotational signal. In addition, the control unit 90 will not send a drive signal to the electric motor 31 so that the motor 31 is retained in a stationary state.

The clutch lever 5 is operated to pull the clutch cable 59, which turns the lever arm 283 to turn the crankshaft, upward moving the piston 42 of the motor actuator 40. Thus, the hydraulic pressure is supplied from the motor actuator 40 via the clutch hydraulic line to the clutch slave cylinder 21. When the hydraulic pressure is supplied to the clutch slave cylinder 21 to push the push rod 18, the clutch mechanism CL is released. In this way, in the state where the "0-level" is set by the assist force setting knob 91, the clutch mechanism CL is released without driving the electric motor 31.

A description is next made of operation in a case of setting any one of "1-3 levels" by the assist force setting knob 91. If the clutch lever 5 is operated at this level to turn in the direction of arrow A, the second turning angle sensor 57 detects its turning angle and sends the detection information signal to the control unit 90. At this time, the control unit 90, in response to the turning angle signal thus received of the clutch lever 5, sends a drive signal to the electric motor 31 for rotational driving. Thus, the crankshaft 234 described above is rotationally driven by the electric motor 31 to supply the clutch hydraulic pressure to the clutch slave cylinder 21 from the motor actuator 40.

At this time, the first turning angle sensor 39 detects the turning angle of the crankshaft 234 and sends the detection signal to the control unit 90 via the signal line 90a. Upon receipt of the signal, the control unit 90 calculates the actual turning angle position of the crankshaft 234 and executes the drive correction for the electric motor 31. More specifically, the control unit 90 uses the signal from the first angle sensor 39 as feedback information to exercise the drive control on the electric motor 31 so that the accurate assist force may be provided in accordance with the operation of the clutch lever 5.

Figure 17:
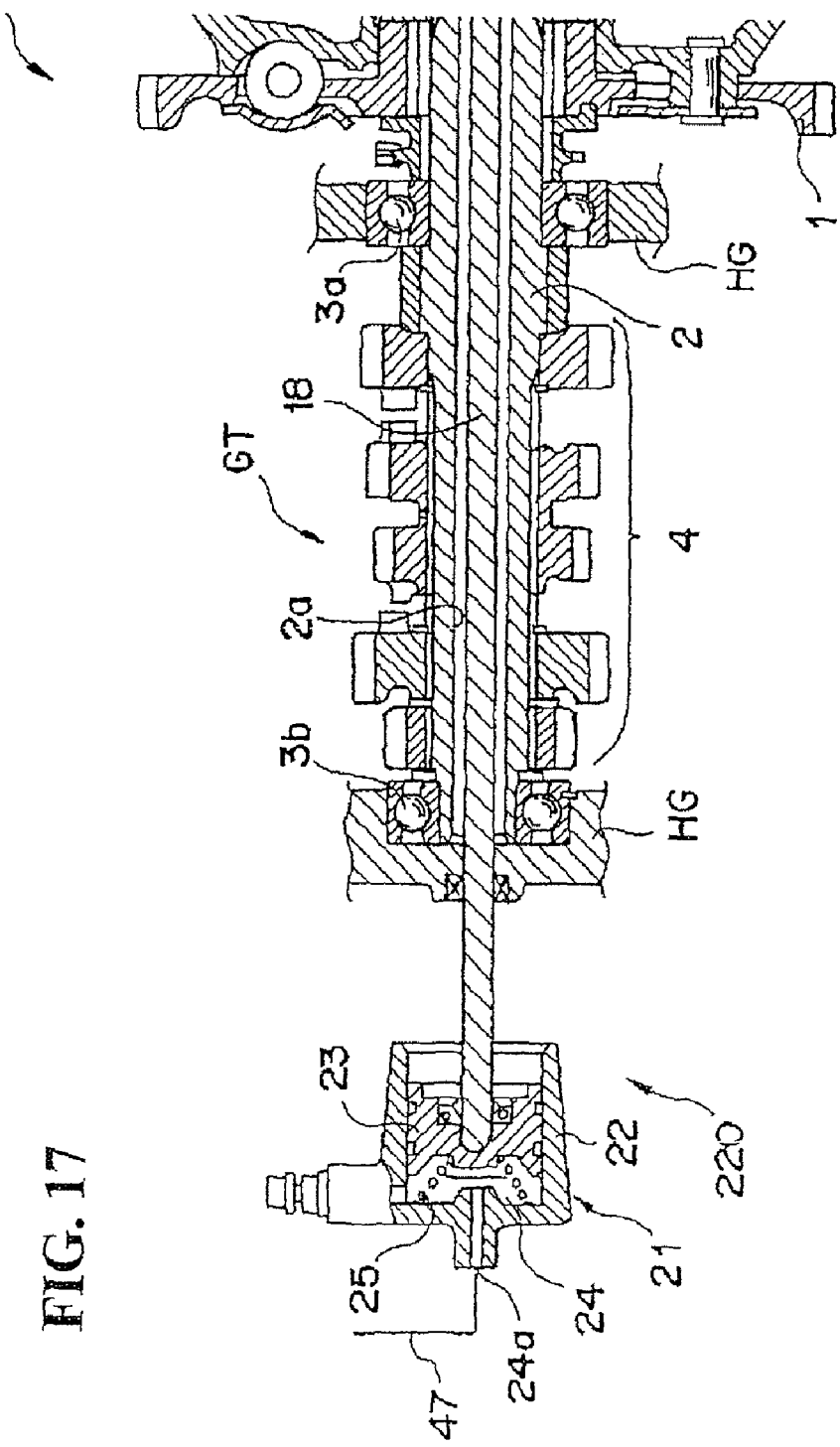
FIG. 17 is a cross-sectional view of the partial configuration of a power unit provided for the motorcycle according to the second embodiment.
Figure 18:
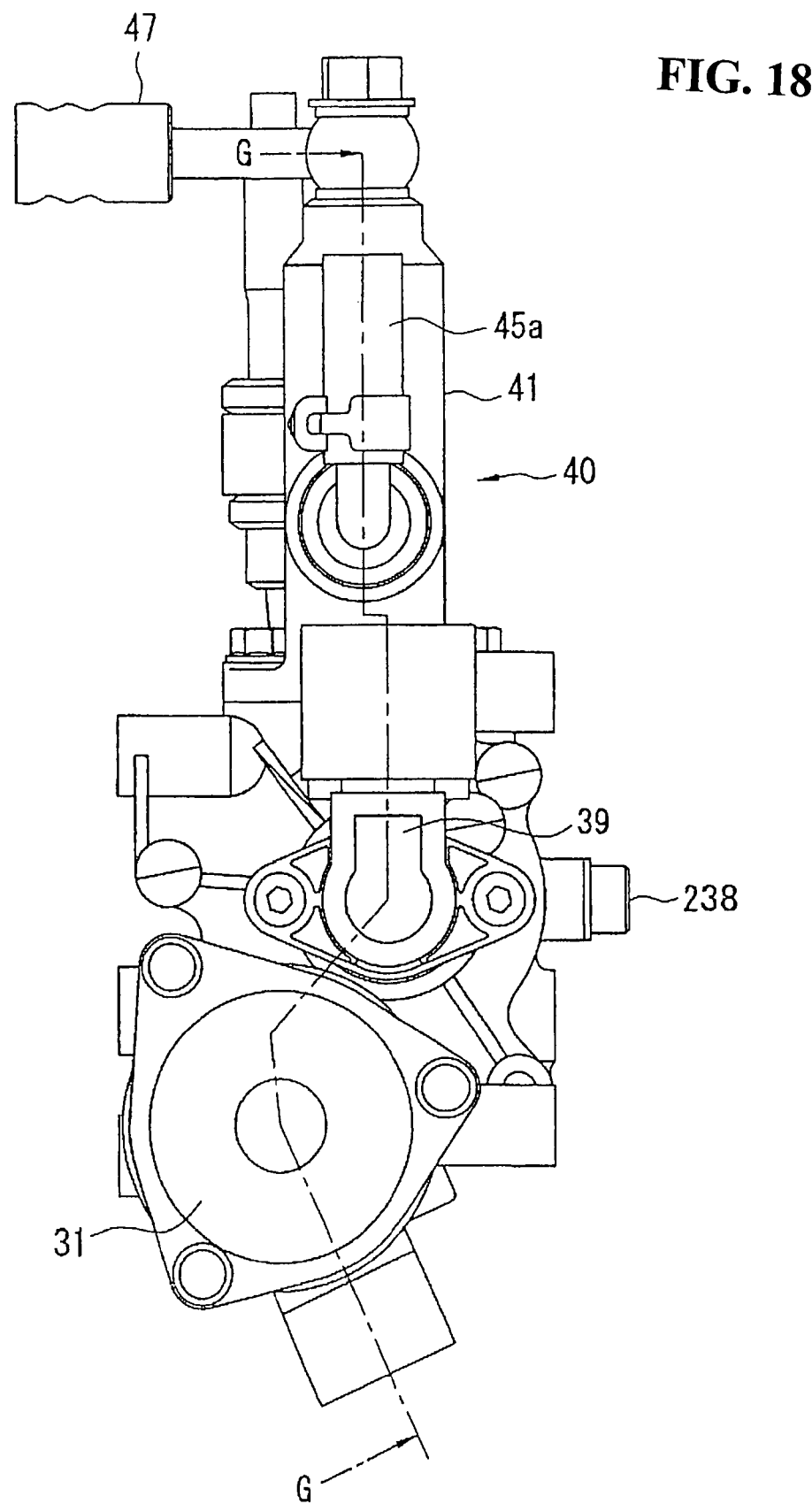
FIG. 18 is a front view illustrating a motor actuator according to the second embodiment.
Figure 19:
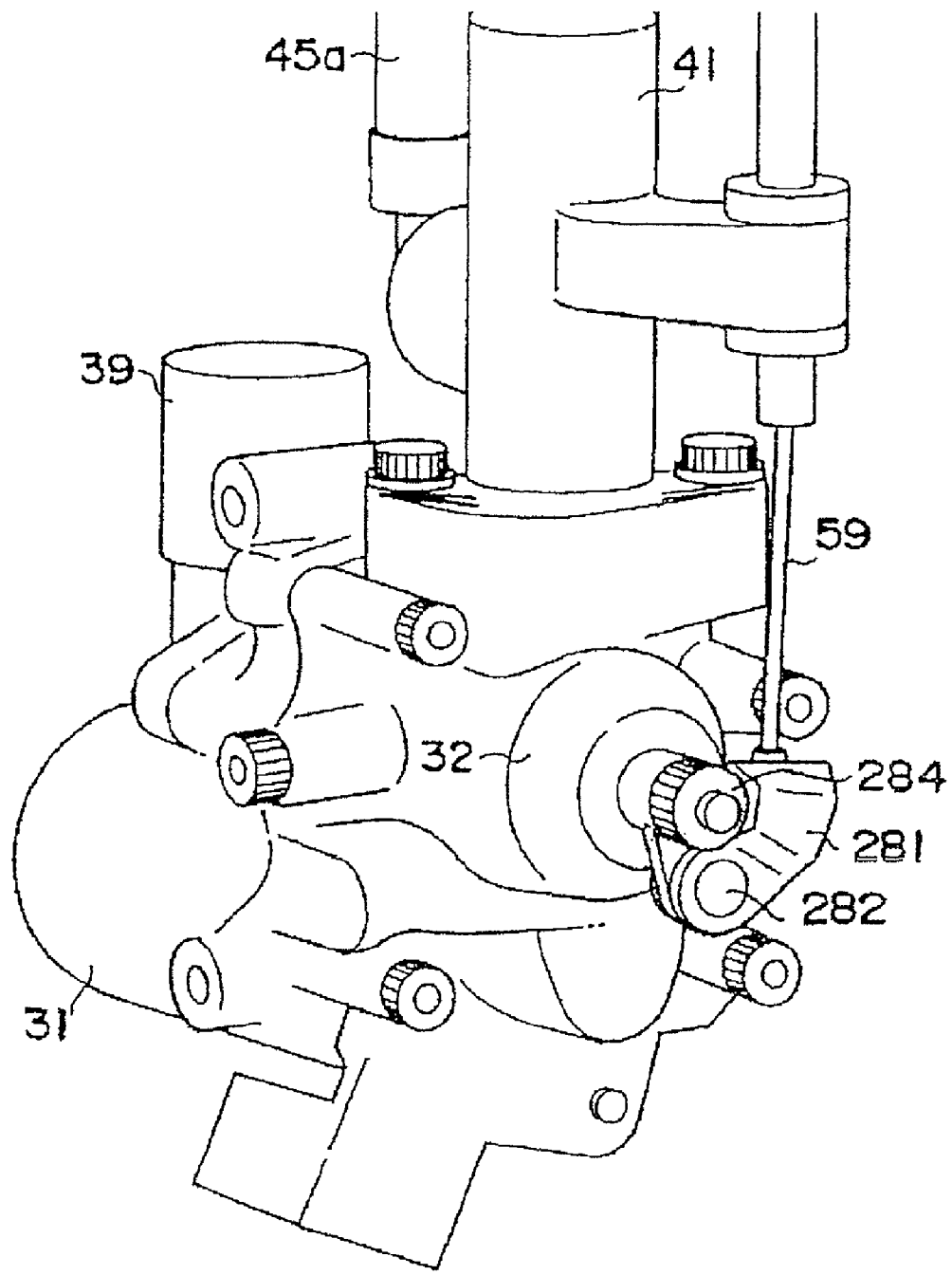
FIG. 19 is a perspective view illustrating the external appearance of the motor actuator according to the second embodiment.

In this way, if the electric motor 31 is driven to supply the clutch hydraulic pressure to the clutch slave cylinder 21 from the motor actuator 40, the clutch slave piston 23 receives the clutch hydraulic pressure and moves rightward in FIG. 17 to press the push rod 18 rightward. This pressing force acts as force that assists the operation of the clutch lever 5, thus reducing the operation force of the clutch lever 5 operated by the rider. In this case, the control unit 90 changes the drive control content of the electric motor 31 in accordance with the setting level and executes the gain adjustment of the assist force according to the operation of he clutch lever 5. Specifically, the drive control of the electric motor 31 is exercised so that at setting level 1 the gain is made small to make the assist force relatively small and at setting level 3 the gain is made large to make the assist force large.

A third embodiment of the present invention is next described with reference to FIGS. 24 through 31. A portion different from the first embodiment is mainly described here.

A clutch slave cylinder 321 constituting part of a clutch actuator 320 according to the present embodiment is configured to include a clutch slave cylinder case 322, a first clutch slave piston 323b, a second clutch slave piston 323a and a return spring 325. The clutch slave cylinder case 322 is composed of a first case 322a and a second case 322b. The first clutch slave piston 323b is disposed to be insertably fitted into the cylinder hole of the first case 322a and abutted against the end of the push rod 18. The second clutch slave piston 323a is disposed to be insertably fitted into the cylinder hole of the second case 322b. The return spring 325 is dispose in the clutch slave hydraulic chamber 326 which is disposed in the cylinder hole of the first case 322a so as to be defined by the first clutch slave piston 323b and the first case 322a. A dust seal 327 is provided between the first clutch slave piston 323b and the push rod 18 so as to prevent entry of foreign matter from the outside.

The first case 322a is provided with an inlet port 326a communicating with the clutch slave hydraulic chamber 326. The clutch slave cylinder 321 is configured such that the clutch slave hydraulic chamber 326 receives assist hydraulic pressure supplied from the inlet port 326a via an assist hydraulic line 47. The second case 322b is provided with an inlet port 324a communicating with the clutch slave hydraulic chamber 324 which is formed in the cylinder hole of the second case 322b so as to be defined by the second clutch slave piston 323a and the second case 322b. The clutch slave cylinder 321 is configured such that the clutch slave hydraulic chamber 324 receives therein clutch hydraulic pressure supplied from the inlet port 324a through the clutch hydraulic line 27.

An air-bleeding bolt 328 is insertably fitted into and fastened to an insertion hole communicating with the clutch slave hydraulic chamber 326 of the first case 322a. Similarly, an air-bleeding hole 328 is insertably fitted into and fastened to an insertion hole communicating with the clutch slave hydraulic chamber 324 of the second case 322b. These air-bleeding bolts 328 are adapted to cause an air bubble mixed in the hydraulic oil supplied to the clutch slave hydraulic chambers 324, 326 to escape outward. This prevents the lowering of a pressing force of the hydraulic oil applied to the first and second clutch slave pistons 323b and 323a.

In the present embodiment described above, the clutch slave cylinder 321 is configured to include the first and second cases 322a, 322b. The clutch mechanism CL may be actuated only by using the clutch hydraulic pressure supplied from a clutch master cylinder 70 (detailed later) via the clutch hydraulic line 27 without use of the assist hydraulic pressure by the motor actuator 40. In this case, the second case 322b may be attached to the side of the clutch mechanism CL without attachment of the first case 322a. In addition, the first case 322a can be attached (so as to be put between the side of the clutch mechanism CL and the second case 322b) as necessary. Thus, the configuration of the clutch slave cylinder 321 can be modified easily.

Figure 26:
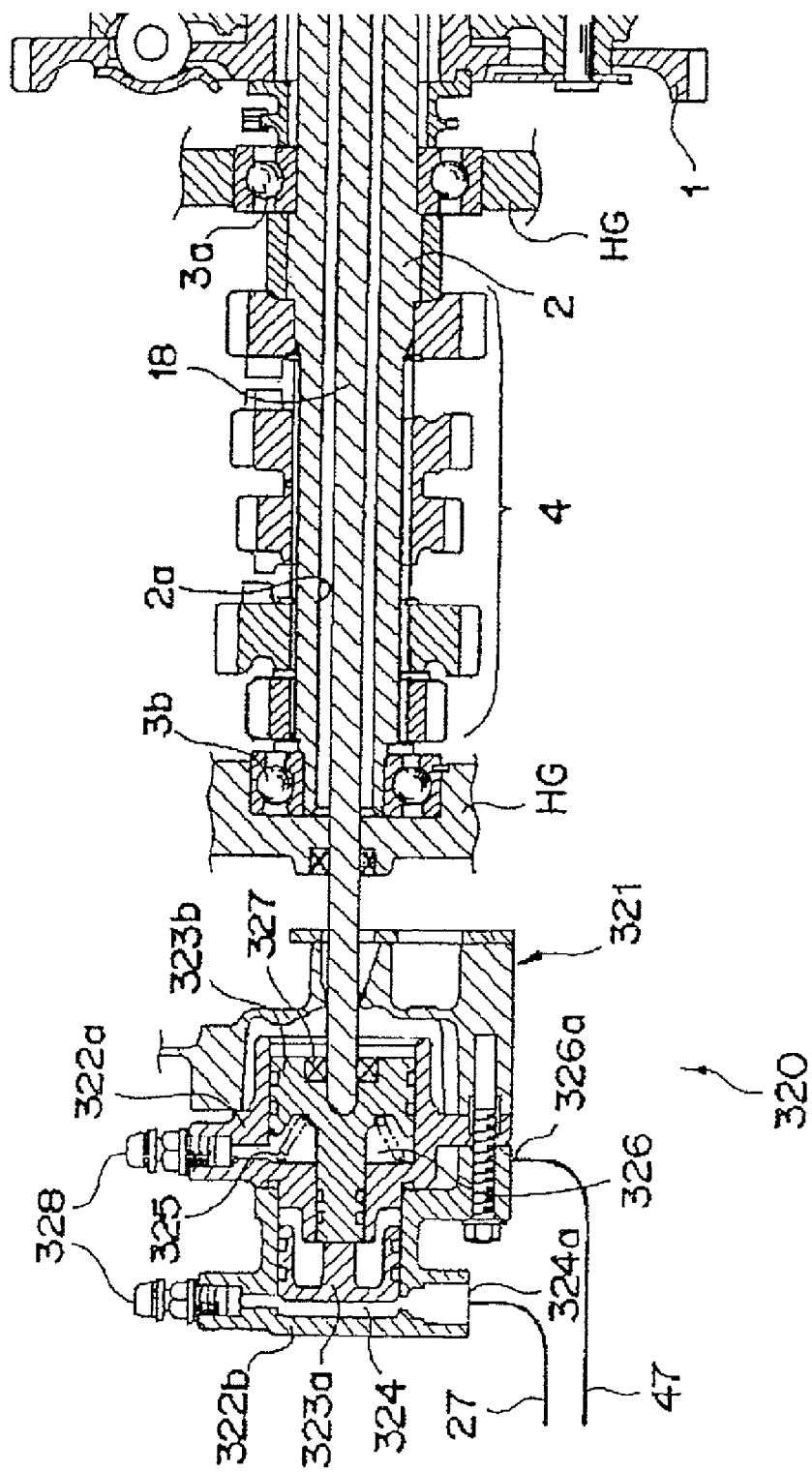
FIG. 26 is a cross-sectional view illustrating the partial configuration of the power unit provided for the motorcycle according to the third embodiment.
Figure 27C:
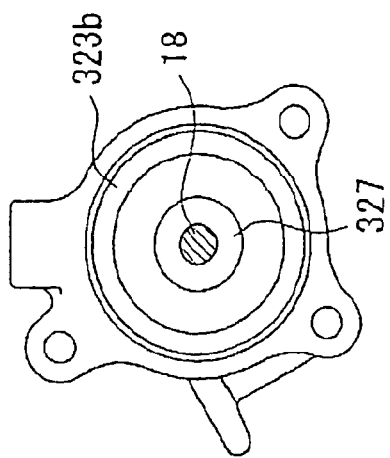
FIG. 27(*a*) is a left lateral view illustrating a clutch slave cylinder according to the third embodiment, FIG. 27(*b*) is a cross-sectional view taken along line K-K of FIG. 27(*a*) and FIG. 27(*c*) is a right lateral view thereof.
Figure 27B:
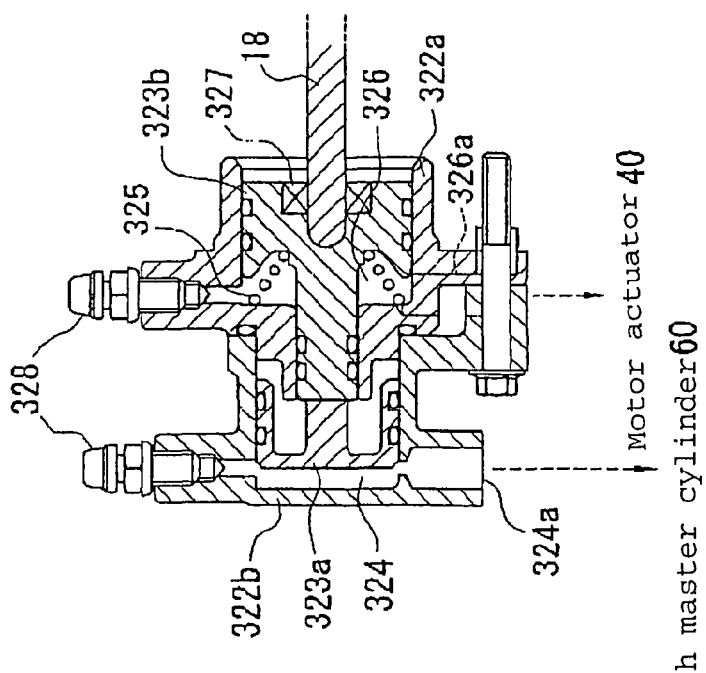
Figure 27A:
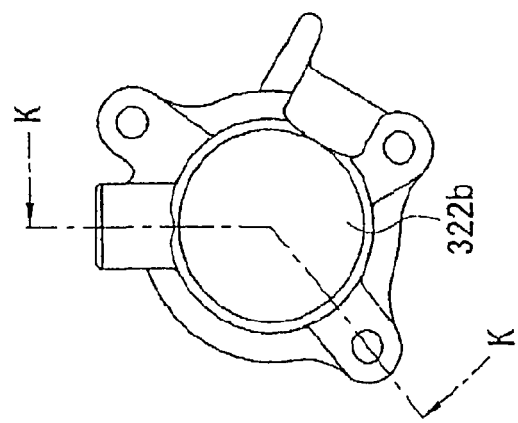

With the configuration of the clutch slave cylinder 321 described above, if the clutch hydraulic pressure is supplied into the clutch slave hydraulic chamber 324, the second clutch slave piston 323a is axially pressed and moved to push and move the push rod 18 rightward in FIG. 26. If the assist hydraulic pressure is supplied into the clutch slave hydraulic chamber 326, the first clutch slave piston 323b is axially pressed and moved to press and move the push rod 18 rightward in FIG. 26. In short, if the hydraulic pressure is supplied to any one of or both of the clutch slave hydraulic chambers 324 and 326, the push rod 18 presses and moves the receiving member 317 rightward to release the clutch mechanism CL.

Incidentally, the configuration of the motor actuator 40 which supplies assist hydraulic pressure to the clutch slave cylinder 321 by the rotational drive force of the electric motor 31 is the same as that of the first embodiment.

Figure 28:
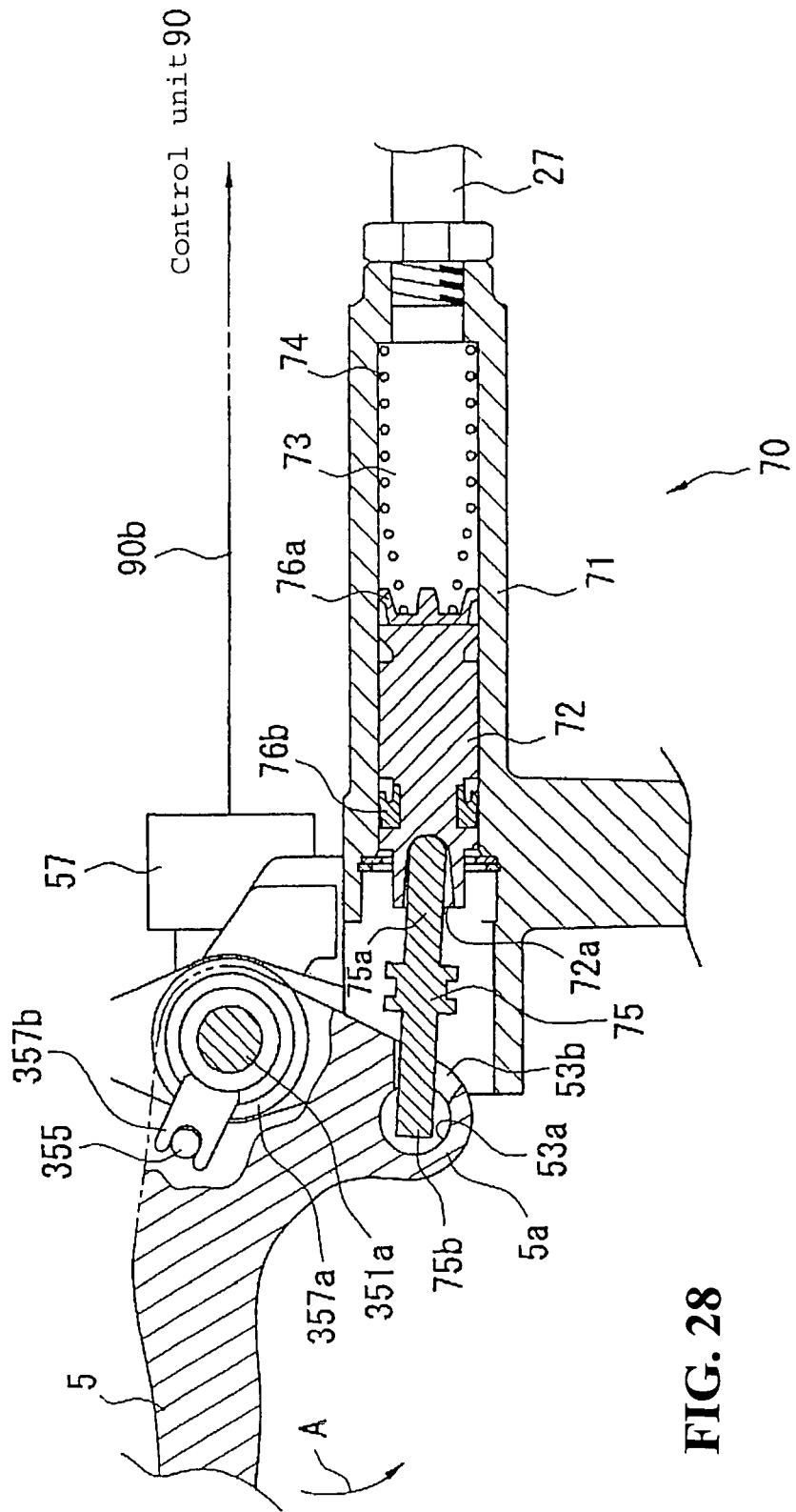
FIG. 28 is a plan and cross-sectional view illustrating the clutch master cylinder in the third embodiment.
Figure 29:
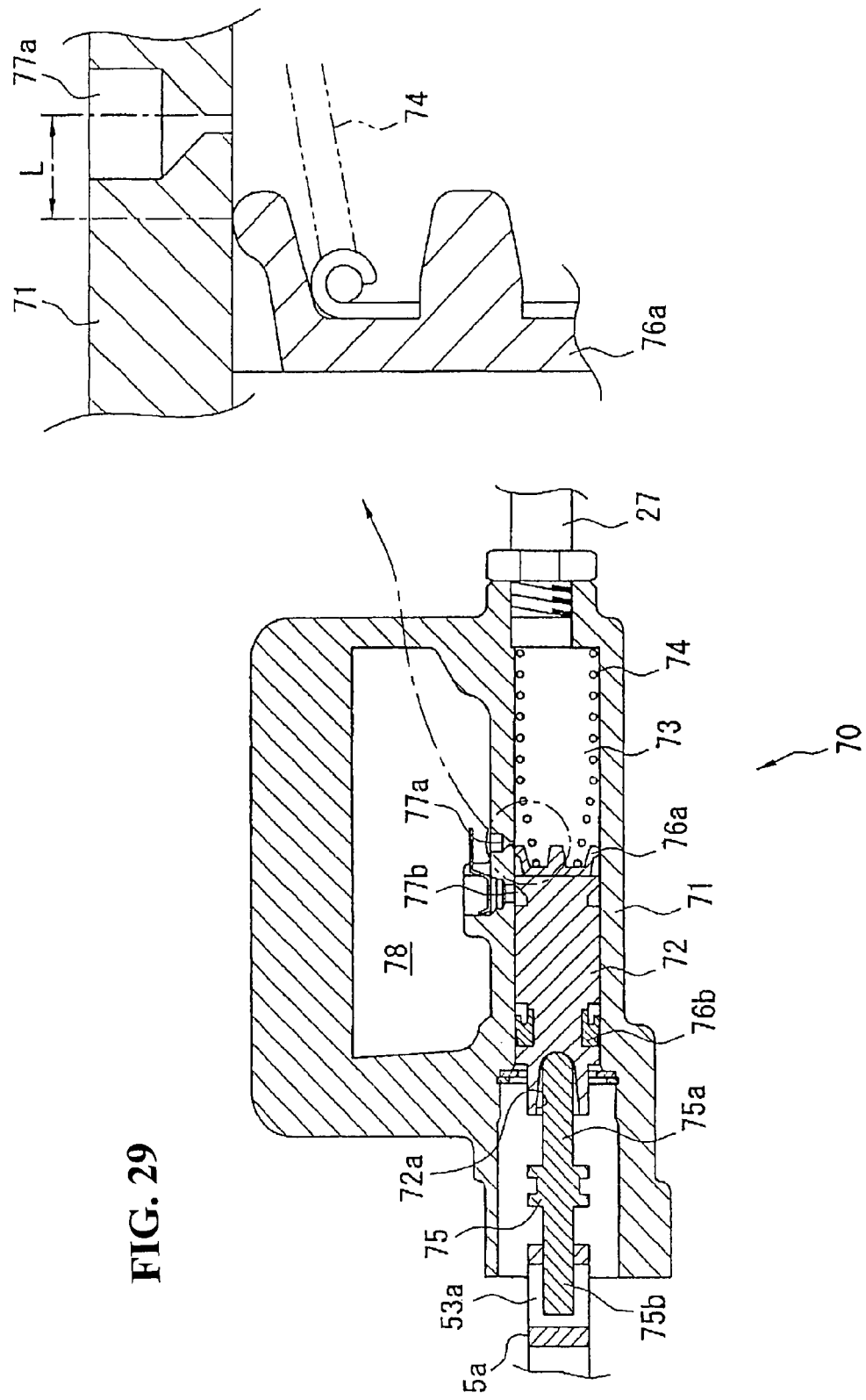
FIG. 29 includes a lateral and cross-sectional view illustrating the clutch master cylinder in the third embodiment.

A description is next made of the configuration of a clutch lever 5 and peripherals thereof adaptable for actuation for releasing the clutch mechanism CL mainly using FIGS. 28 and 29. The present embodiment includes a clutch hydraulic pressure generator 50 which supplies clutch hydraulic pressure to the clutch hydraulic line 27. The clutch hydraulic pressure generator 50 generates clutch hydraulic pressure in response to the operation of the clutch lever 5. The clutch hydraulic pressure generator 50 is configured to include a clutch master cylinder 70 which generates clutch hydraulic pressure in conjunction with the operation of the clutch lever 5.

The clutch master cylinder 70 is configured to include a clutch master cylinder case 71, a clutch mater piston 72, and a return spring 74. The clutch master cylinder case 71 is fixedly provided on the left side portion of the steering handlebars SH (see FIG. 25). The clutch master piston 72 is disposed to be insertably fitted into the cylinder hole of the clutch master cylinder case 71. The return spring 74 biases the clutch master piston 72 leftward in FIGS. 28 and 29. A clutch master hydraulic chamber 73 is formed in the cylinder hole of the clutch master cylinder case 71 so as to be defined by the clutch master piston 72 and the clutch master cylinder case 71. The clutch master hydraulic chamber 73 communicates with the clutch hydraulic pressure line 27 via a connection port 73a. A primary cup 76a is sealably attached to the outer circumference of the right end portion of the piston 72. Similarly, a secondary cup 76b is sealably attached to the outer circumference of the piston 72 on the left side of the left-right-directional central portion thereof. The primary and secondary cups 76a and 76b are adapted to prevent the hydraulic oil supplied from a hydraulic oil reservoir 78 from leaking toward the left side of the piston 72 between the piston 72 and the inner wall of the cylinder case 71.

The clutch master cylinder case 71 is secured to the steering handlebars SH and the clutch lever 5 is turnably attached to the steering handlebars SH by a pin 351a. The clutch lever 5 is configured to turn in a direction indicated with arrow A in the figures while the rider operates the clutch lever to grip it with his or her left hand. Incidentally, FIGS. 28 and 29 illustrate the clutch 5 in a non-operated state (the clutch-engagement state).

A connection rod 75 has a leading end portion 75a which is put inside the proximal end side recess portion 72a of the clutch master piston 72 and is abutted against and fitted thereinto. In addition, the connection rod 75 has a proximal end portion 75b connected to the proximal end portion 5a of the clutch lever 5. However, the proximal end portion 5a of the clutch lever 5 is formed only with a through-hole 53a passing therethrough above and below and with an attachment slot 53 extending to pass therethrough into the through-hole 53a from the lateral surface side thereof. Thus, the proximal end portion 75b of the connection rod 75 is inserted into the through-hole 53a from the attachment slot 53b.

The second turning angle sensor 57 is attached to the lower end of the pin 351a. A turning arm 357b is integrally attached to a turning portion 357a of the second turning angle sensor 57. The turning arm 357b is press fitted into the clutch lever 5 and engaged with an engaging rod 355 projecting downwardly. Thus, if the clutch lever 5 is operated to turn around the pin 351a in the direction of arrow A, the turning portion 357a is similarly turned via the engaging rod 355 and turning arm 357b. The second turning angle sensor 57 can detect the operational angle of the clutch lever 5 (the turning amount of the clutch lever 5).

As shown in FIGS. 28 and 29, in the state where the clutch lever 5 is not operated, the piston 72 having the left end portion abutted against the connection rod 72 is located at the left dead point. In this state, the right end of the seal surface of the primary cup 76a for the piston 72 is located on the right side of the opening port 77b and on the left side of an opening port 77a, so that the hydraulic chamber 73 communicates with the hydraulic oil reservoir 78. Consequently, the hydraulic oil in the hydraulic oil reservoir 78 is supplied to the hydraulic chamber 73.

If operation of the rider allows the clutch lever 5 to turn in the direction of arrow A in FIG. 28, which moves the connection rod 75 rightward in FIGS. 28 and 29, the piston 72 having the left end portion abutted against the connection rod 75 moves rightward in FIGS. 28 and 29 against the biasing force of the return spring 74 and is located at the right dead point. The rightward movement of the piston causes the right end of the piston 72 to pass and close the opening port 77a. Thus, the hydraulic oil in the hydraulic chamber 73 is compressed and increased in pressure according to the rightward movement of the piston 72.

Until the close contact portion between the primary cup 76a and cylinder case 71 passes the opening port 77a along with the rightward movement of the piston 72, some hydraulic oil flows out through the opening port 77a to the hydraulic oil reservoir 78. Therefore, the hydraulic oil in the hydraulic chamber 73 is moderately increased in pressure. After the close contact portion passes over the opening port 77a, the hydraulic oil in the hydraulic chamber 73 is sharply increased in pressure. In other words, as shown in the enlarged view of FIG. 29, the length L is a no-effect stroke of the piston 72. In this way, the hydraulic oil in the hydraulic chamber 73 is compressed to increase in pressure and supplied to the clutch actuator 320 via the clutch hydraulic line 27.

Figure 24:
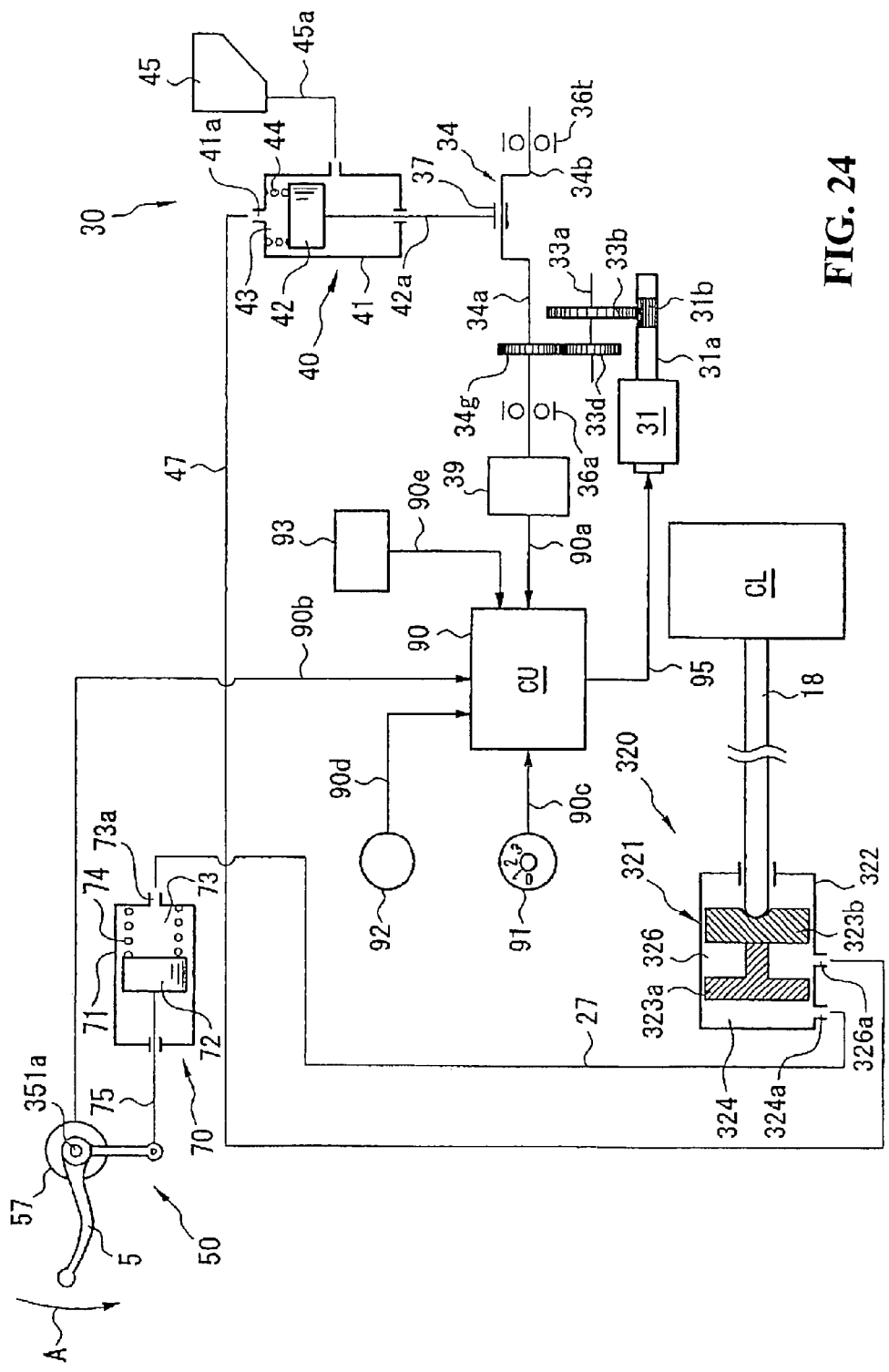
FIG. 24 is a schematic illustrating the entire configuration of the clutch device according to a third embodiment of the present invention.
Figure 25:
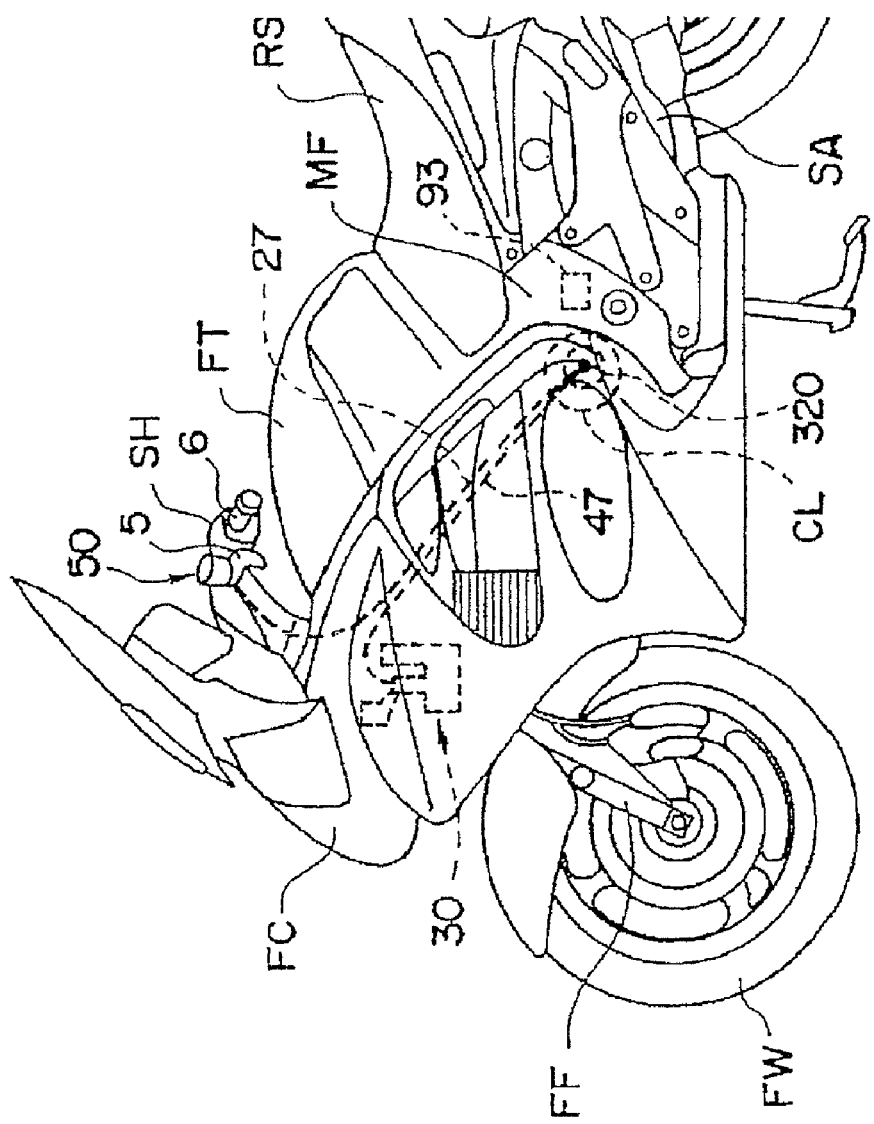
FIG. 25 is a lateral view illustrating the entire external appearance of a motorcycle equipped with the clutch device according to the third embodiment.

As shown in FIG. 24, the control unit 90 receives a turning angle detection signal of the crankshaft 34 from the first turning angle sensor 39 and a clutch lever operating angle signal from the secondary turning angle sensor 57 sent via the signal lines 90a and 90b, respectively. An assist force setting knob 91 is provided a position where the rider can operate it in the motorcycle and is manually operated to set the assist force generated by the motor actuator 40 at four stages, 0 to 3 stages. Also this assist force setting signal can be sent to the control unit 90 via the signal line 90c.

Figure 30:
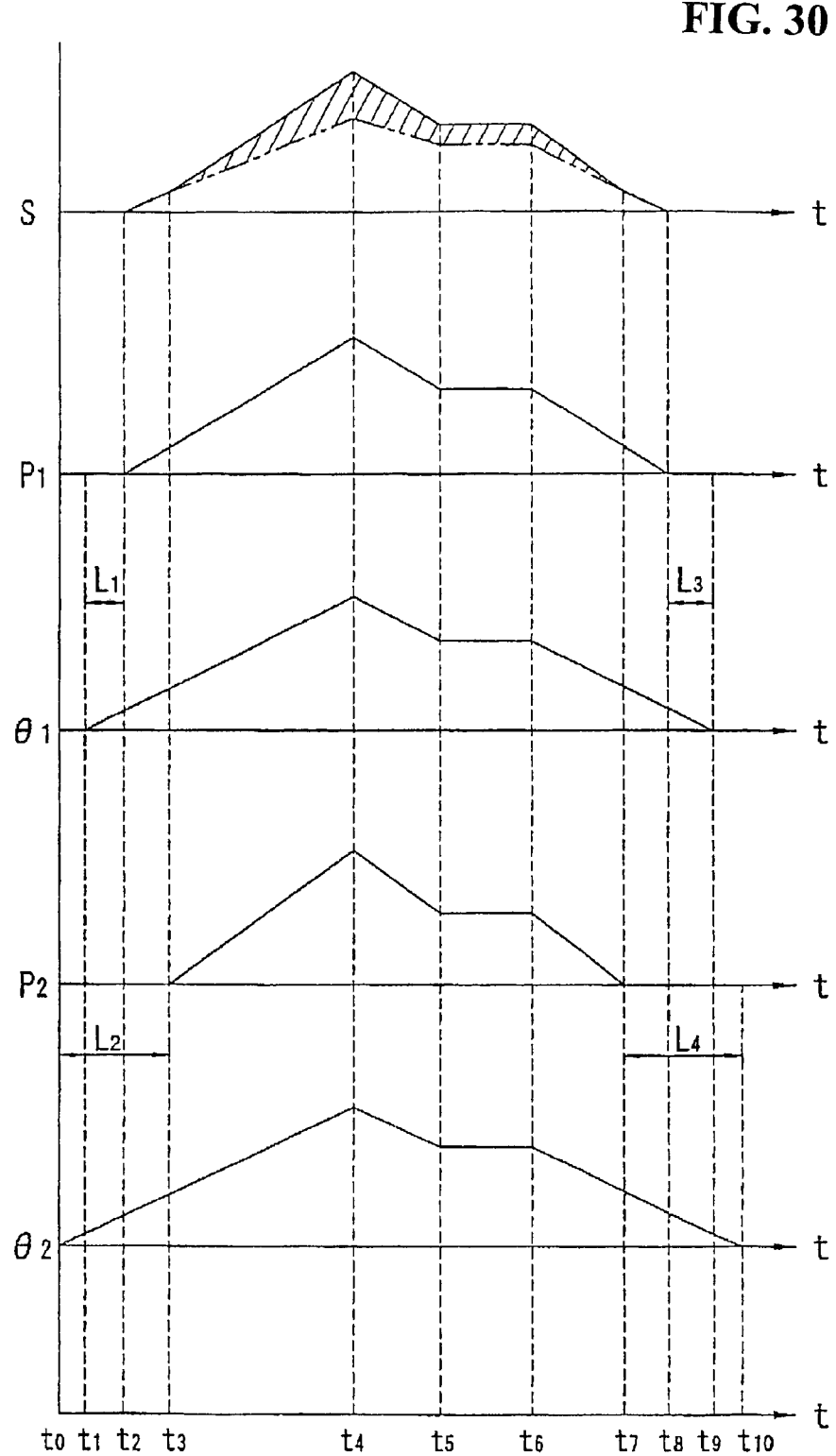
FIG. 30 is a graph illustrating time variations of various parameters at the time of operatively engaging and disengaging the clutch mechanism according to the third embodiment.

A description is made of time variations of assist control encountered when the clutch mechanism CL is actuated by the control unit 90 along with the operation of the clutch lever 5 with reference to FIG. 30. FIG. 30 illustrates a time variation of a turning amount of the crankshaft 34 detected by the first turning angle sensor 39 (an turning angle $\theta_1$ of the crankshaft 34 from the state where the piston rod 42a is located at the bottom dead point); a time variation of an operation amount (an turning angle $\theta_2$) detected by the secondary turning angle sensor 57); a time variation of the assist pressure $P_1$ in the hydraulic chamber 43 of the motor actuator 40; a time variation of the hydraulic oil pressure $P_2$ generated in the clutch master hydraulic chamber 73 of the clutch master cylinder case 71; and a travel distance (stroke S) of the push rod 18 from the most leftward position (a state where the clutch hydraulic pressure is not generated) to the right direction. Since the push rod 18 is elastically displaced by the pressing force, the stroke S is proportional to the pressing force applied to the push rod 18.

It is assumed, first, that the rider starts to operatively turn the clutch lever 5 at time $t_0$. As shown in the figure, the turning angle $\theta_2$ (operation angle) of the clutch lever 5 increases (arrow A direction, that is, a counterclockwise direction as viewed on the plane is assumed to be a positive direction) just after the clutch lever 5 is started to turn. The control unit 90 is controlled so that after a lapse of time t1 after the clutch lever 5 has bee started to turn, the turning angle $\theta_1$ of the first crankshaft 34 increases. In other words, after the clutch lever 5 is started to turn, the electric motor 31 is started to be driven after a lapse of time t1.

After the electric motor 31 is started to be driven, at time $t_2$, the assist hydraulic pressure $P_1$ in the hydraulic chamber 43 of the motor actuator 40 is started to increase. As just described, the time lag $L_1$ exists between the start of a rise in assist pressure $P_1$ and the start of drive of the electric motor 31. This is because the non-effect stroke of the piston 42 is set at the length E as described above with use of FIG. 10 and therefore the hydraulic oil in the hydraulic chamber 43 is not increased in pressure until the primary cup 46a passes over the opening port 45c.

Subsequently, at time $t_3$, the hydraulic oil pressure $P_2$ of the clutch master hydraulic chamber 73 is started to rise. A time lag $L_2$ exists between the start of the increase in the hydraulic oil pressure $P_2$ and the start of the turning operation of the clutch lever 5. This is because non-effect stroke of the piston 72 is set at the length L and therefore the hydraulic oil in the hydraulic chamber 73 is not increased in pressure until the primary cup 76a passes over the opening port 77a.

As shown in FIG. 30, the magnitude of the stroke S of the push rod 18 (the pressing force applied to the push rod 18) undergoes a transition in proportion to the pressure obtained by adding the assist pressure $P_1$ to the hydraulic oil pressure $P_2$. Incidentally, the hatched portion of the stroke S in FIG. 30 indicates its magnitude of the stroke S encountered when the assist pressure to be supplied via the hydraulic line 47 to the clutch slave cylinder 321 is not supplied thereto but only the clutch hydraulic oil pressure is supplied from the clutch master cylinder 70 via the clutch hydraulic pressure line 27. In this way, the stroke S is increased compared with the case where the assist pressure is not supplied.

The control unit 90 exercises control so that the assist pressure $P_1$ in the hydraulic chamber 43 of the motor actuator 40 is increased before the hydraulic pressure $P_2$ of the clutch mater hydraulic chamber 73 is increased. This is because of the following: If the control is exercised so that the hydraulic oil pressure $P_2$ is increased before the assist hydraulic pressure $P_1$ is increased, the lever reaction force applied to the rider resulting from the hydraulic pressure $P_2$ when the clutch lever 5 is operatively turned is suddenly reduced due to the start of the increased assist hydraulic pressure $P_1$. Thus, the rider has uncomfortable feeling as if the clutch lever 5 suddenly lightens at the time of the start of the increased assist hydraulic pressure $P_1$. Such uncomfortable feeling should be eliminated. As in the present embodiment, the control is exercised so that the assist hydraulic pressure $P_1$ is increased before the hydraulic pressure $P_2$ is increased. Therefore, at the time of start of the increased assist pressure $P_1$, the hydraulic pressure $P_2$ is at a zero-level (the atmospheric pressure) yet, which can prevent the sudden reduction in the lever reaction force.

As shown in FIG. 30, the stroke S of the push rod 18 is maximized at time $t_4$ and the rider executes a gear shift by pedaling a shift pedal 61 described later. Thereafter, at time between times $t_4$ and $t_5$ the clutch lever 5 is operated to be slightly returned, at time between times $t_5$ and $t_6$ steadily maintained at the turning angle $\theta_2$, and at time between times $t_6$ and $t_{10}$ moderately returned.

When the clutch lever 5 starts to turn in a direction of returning to the original position (the direction opposite to the direction of arrow A), as shown in the figure, at time $t_7$, the hydraulic pressure $P_2$ of the clutch master hydraulic chamber 73 is reduced to the zero-level (the atmospheric pressure). Subsequently, at time $t_8$, the assist hydraulic pressure $P_1$ of the hydraulic chamber 43 of the motor actuator 40 is reduced to the zero-level (the atmospheric pressure). Then, at time $t_9$, the turning angle $\theta_1$ of the crankshaft 34 returns to the zero-level, that is, the drive of the electric motor 31 is stopped. Thereafter, at time $t_{10}$, the operational angle $\theta_2$ of the clutch lever 5 returns to the zero-level, that is, the clutch lever 5 returns to the original position.

The piston 42 has the non-effect stroke of the length E and the piston 72 has the non-effect stroke of the length L. Therefore, also when the clutch lever 5 is returned to the original position, the time lag $L_3$ exists between time $t_9$ when the assist hydraulic pressure $P_1$ returns to the zero-level and time $t_9$ when the drive of the electric motor 31 is stopped. In addition, the time lag $L_4$ exists between time $t_7$ when the hydraulic pressure $P_2$ returns to the zero-level and time $t_{10}$ when the clutch lever 5 is returned to and stopped at the original position.

When the clutch lever 5 is returned to the original position, the control unit 90 exercises control so that the hydraulic pressure $P_2$ of the clutch master hydraulic chamber 73 is reduced to the zero-level before the assist hydraulic pressure $P_1$ in the hydraulic chamber 43 of the motor actuator 40 is reduced to the zero-level. With such control, at the time when the assist hydraulic pressure $P_1$ is reduced to the zero-level, the hydraulic pressure $P_2$ has already been reduced to the zero-level. Thus, the rider is prevented from having uncomfortable feeling as if the clutch lever 5 suddenly gets heavy at the time of the reduced assist hydraulic pressure $P_1$ to the zero-level, due to the lever reaction force applied to the rider resulting from the hydraulic pressure $P_2$.

The control unit 90 receives a switching signal from an auto clutch mode switching button 92 via a signal line 90d as well as the turning angle detection signal of the crankshaft 34 from the first turning angle sensor 39 via the signal line 90a and the clutch lever operational angle signal from the secondary turning angle sensor 57 via the signal line 90b as described above. This auto-clutch mode switching button 92 is configured to enable on-off-operation. If being on-operated, this switching button 92 sets an auto-clutch mode. On the other hand, while if off-operated, the switching button 92 sets an assist clutch mode. The auto-clutch mode switching button 92 is disposed in the motorcycle at a position where a rider can operate it. Thus, the rider can operatively switch the switching button 92 arbitrarily.

The control unit 90 receives an engine rotation signal from an engine rotation sensor (not shown) which is attached to the engine not shown to detect engine speed (Ne). The control unit 90, in response to engine speed Ne inputted, exercises control to supply fuel and air to the engine for increasing engine speed Ne or to interrupt fuel supplied to the engine and stop ignition of an ignition plug for reducing engine speed Ne.

Further, the control unit 90 receives a load detection signal from a load sensor 93 via a load signal line 90e in addition to the above signals. The load sensor 93 is composed of a strain gauge type load cell adapted to detect a pedaling force transmitted when the rider pedals a shift pedal 61 as shown in FIG. 31 to execute a gear shift of the transmission TM.

Figure 31:
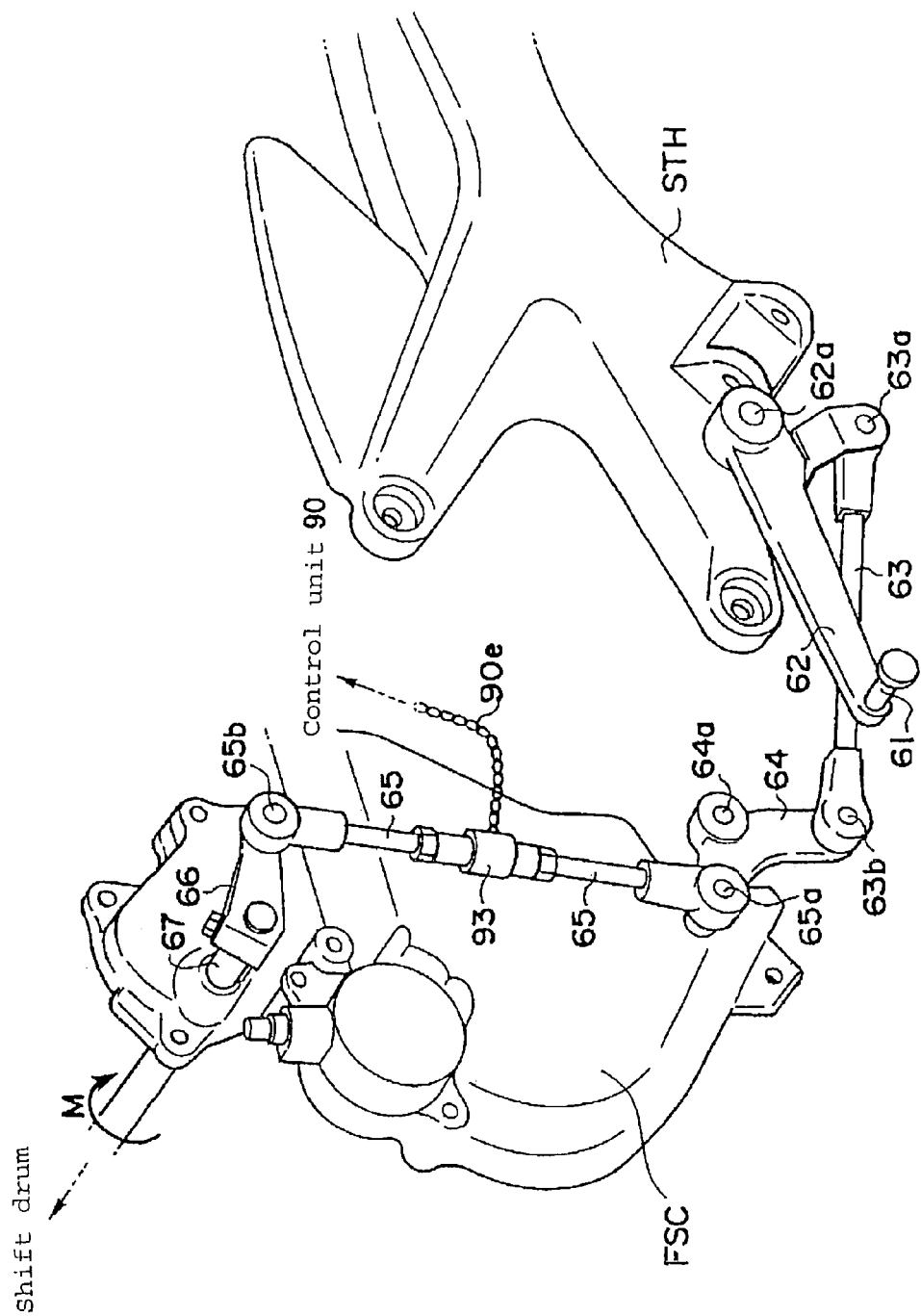
FIG. 31 a perspective view illustrating a load sensor with its peripherals attached to the motorcycle according to the third embodiment.

Referring to FIG. 31, a first shift arm 62 is attached to a step holder STH attached to the main frame MF to be turnable around a pivot shaft 62a. The first shift arm 62 is provided at its leading end side with a shift pedal 61 used by the rider executing pedaling operation. The first shift arm 62 is pivotally coupled to one end of a first tie-rod 63 extending almost horizontally backward and rearward with a pivotal connection pin 63a. The other end of the first tie-rod 63 is connected to one end of an almost L-shaped connection member 64 with a pivotal connection pin 63b. The connection member 64 is pivotally attached to a front sprocket cover FSC with a pivotal connection pin 64a. The other end of the connection member 64 is pivotally connected to the lower end portion of a second tie-rod 65 extending almost upward and downward with a pivotal connection pin 65a. The second tie-rod 65 grips the load sensor 93 formed almost columnar. The upper end of the second tie-rod 65 is pivotally coupled to a second shift arm 66 with a pivotal connection pin 65b so that the second tie-rod 65 is movable almost upward and downward. A detection line 90e (wiring cord) extends from the load sensor 93 to send a detection signal to the control unit 90. The second shift arm 66 is coupled to a shaft member 67 connected to a shift drum not shown to execute gear shifting. If the shaft member 67 turns around the longitudinally axial direction thereof, the second shift arm 66 is swung up and down integrally with the shaft member 67.

With the peripherals of the load sensor 93 configured described above, if the rider pedals the shift pedal 61 for gear shifting, the first shift arm 62 pivots downward to move the first rod 63 rearward. Along with the rearward movement of the first rod 63, the connection member 64 pivots to move the second tie-rod 65 downward. At this time, the load sensor 93 detects strain generated in the second tie-rod 65 resulting from the downward movement of the second tie-rod 65 and outputs the detection signal to the control unit 90 via the signal line 90e. The downward movement of the second tie-rod 65 causes the second shift arm 66 to pivot downward. This turns the shaft member 67 in the direction of arrow M in FIG. 31 to turn the shift drum not shown, executing gear shifting. In this way, the load sensor 93 is provided in the transmission system between the shift pedal 61 and the shift drum. Thus, it is possible to detect the pedaling operation of the shift pedal 61 immediately before the start of the gear shifting by the shift drum.

As described above, the control unit 90 is configured to detect the detection signal from the load sensor 93, i.e., the pedaling operation of the shift pedal 61. If the auto-clutch mode switching button 92 is operatively switched to the auto-clutch mode, the control unit 90 sends a control signal to the electric motor 31 immediately before the start of the gear shifting by the shift drum, whereby the clutch mechanism CL is released by the assist hydraulic pressure from the motor actuator 40. Thus, in the auto-clutch mode, even if the clutch lever 5 is not operatively turned, it is possible to release the clutch CL, executing the shift change of the transmission TM.

In the state where the control unit 90 receives the detection signal from the load sensor 93, the control unit 90 exercises control to interrupt fuel supplied to the engine and stop the ignition of the ignition plug to automatically reduce the engine speed Ne of the engine. It is not necessary, therefore, to return the throttle lever (the right hand grip portion) not shown every time to reduce the engine speed Ne of the engine during the pedaling operation of the shift pedal 61. In short, since the cumbersome operation is not needed, the rider can travel comfortably. Incidentally, in the state where the control unit 90 does not receives the detection signal from the load sensor 93 yet (the pedaling operation of the shift pedal 61 is not performed), the control unit 90 does not exercise the automatic control for reducing the engine speed Ne of the engine. Therefore, if the gear shifting by the pedaling operation of the shift pedal 61 is completed, the control of the engine speed Ne is exercised in response to the operation of the throttle lever by the rider.

On the other hand, if the auto-clutch mode switching button 92 is operatively switched to set the assist clutch mode, both the clutch hydraulic oil pressure and the assist hydraulic pressure are supplied via the clutch hydraulic line 27 and the assist hydraulic line 47, respectively, to the clutch slave cylinder 321. Thus, the push rod 18 is pressed and moved to release the clutch mechanism CL on the basis of the turning operation of the clutch lever 5 by the rider and the control of the control unit 90.

Incidentally, the auto-clutch mode switching button 92 may be set at the assist clutch mode and the assist force setting knob 91 may be set at the "0-level". In this case, it is not performed to release the clutch mechanism CL by the assist hydraulic pressure generated by driving the electric motor 31. In addition, it is performed to release the clutch mechanism CL only by the clutch hydraulic pressure generated in the clutch hydraulic pressure generator 50 by the turning operation of the clutch lever 5.

Figure 32:
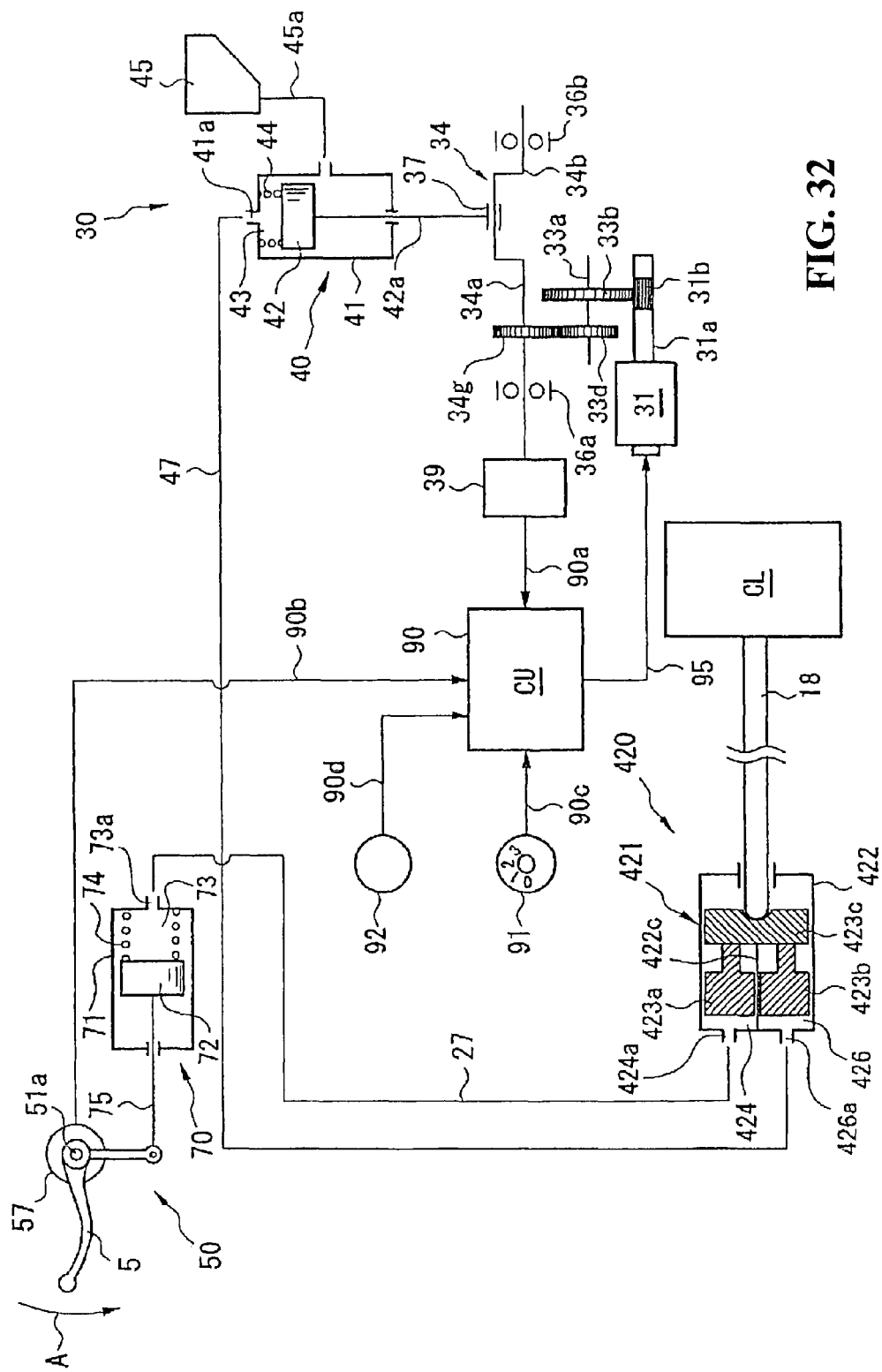
FIG. 32 is a schematic illustrating the entire configuration of a clutch device according to a fourth embodiment of the present invention.

A fourth embodiment of the present invention is next described with reference to FIGS. 32 through 34. A portion different from the first embodiment is mainly described here.

A clutch slave cylinder 421 constituting part of a clutch actuator 420 according to the present embodiment is configured to include a clutch slave cylinder case 422, a push rod guide 423c, a first clutch slave piston 423a, a second clutch slave piston 423b, a return spring 425a and another return spring 425b. The clutch slave cylinder case 422 is composed of a first case 422a and a second case 422b. The push rod guide 423c is disposed to be insertably fitted into the cylinder hole of the first case 422a and abutted against the end of the push rod 18. The first clutch slave piston 423a is disposed to be insertably fitted into one of the cylinder holes of the second case 422b which is internally partitioned into two chambers by a partition portion 422c. The second clutch slave piston 423b is disposed to be insertably fitted into the other of the cylinder holes of the second case 422b. The return spring 425a is disposed in a clutch slave hydraulic chamber 424 which is formed in one of the cylinder holes of the second case 422b and defined by the first clutch slave piston 423a, the second case 422b and the partition portion 422c. The return spring 425b is disposed in the clutch slave hydraulic chamber 426 which is formed in the other of the cylinder holes of the second case 422 and defined by the second clutch slave piston 423b, the second case 422b and the partition portion 422c. A dust seal 427 is provided between the push rod guide 423c and the push rod 18 so as to prevent entry of foreign matter from the outside.

The second case 422b is formed with an inlet port 424a communicating with the clutch slave hydraulic chamber 424 and with an inlet port 426a communicating with the clutch slave hydraulic chamber 426. The clutch slave cylinder 421 is configured such that the clutch slave hydraulic chamber 424 receives therein the clutch hydraulic pressure supplied through the inlet port 424a from the clutch hydraulic line 27. The clutch slave cylinder 421 is configured such that the clutch slave hydraulic chamber 426 receives therein the assist pressure supplied through the inlet port 426a from the assist hydraulic line 47.

Incidentally, the configuration of the motor actuator 40 which supplies assist hydraulic pressure to the clutch slave cylinder 421 by the rotational drive force of the electric motor 31 is the same as that of the first embodiment. In addition, the configuration of the clutch hydraulic pressure generator 50 which supplies the clutch hydraulic pressure to the clutch hydraulic line 27 is the same as that of the third embodiment.

A description is made of the operative details of the engagement and disengagement of the clutch mechanism CL by the hydraulic pressure supplied to the clutch slave cylinder 421 configured described above with reference to FIGS. 33 and 34.

First, if the clutch lever 5 is not operatively turned, the clutch hydraulic pressure is not supplied to the inlet port 424a, that is, into the clutch slave hydraulic chamber 424. Since the first clutch slave piston 423a is not moved, the push rod 423c will not be moved in the axial direction so that the push rod 18 will not be pressed and moved rightward. In addition, the assist hydraulic pressure is not supplied to the inlet port 426a, that is, to the clutch slave chamber 426. Since the second clutch slave piston 423b is not moved, the push rod guide 423c will not be moved in the axial direction so that the push rod 18 will not be pressed and moved rightward in FIG.

Figure 34A:
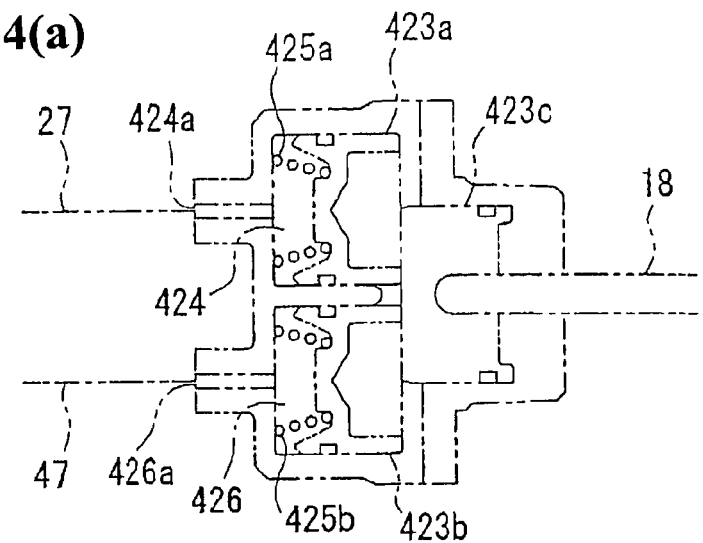
FIG. 34(a) illustrates a clutch slave cylinder operated when the clutch device is not operated in the fourth embodiment.

33. Consequently, the clutch mechanism CL is not released. This state is shown in FIG. 34(a).

Subsequently, in the state shown in FIG. 34(a), if the clutch lever 5 is operatively turned, the clutch hydraulic pressure supplied from the clutch master cylinder 70 is supplied to the inlet port 424a. This increases the hydraulic pressure in the clutch slave hydraulic chamber 424 to move the first clutch slave piston 423a in the axial direction against the biasing force of the return spring 425a.

In addition, if the clutch lever 5 is operatively turned, the secondary turning angle sensor 57 detects the turning of the clutch lever 5. Upon receipt of this detection signal via the signal line 90b, the control unit 90 outputs a control signal to the electric motor 31 via the signal line 95. This control signal drives the electric motor 31, whereby the assist hydraulic pressure is supplied to the inlet port 426a via the assist hydraulic line 47 from the side of the motor actuator 40. This increases the liquid pressure in the clutch slave hydraulic chamber 426 to move the second clutch slave piston 423b against the biasing force of the spring 425b.

Figure 33:
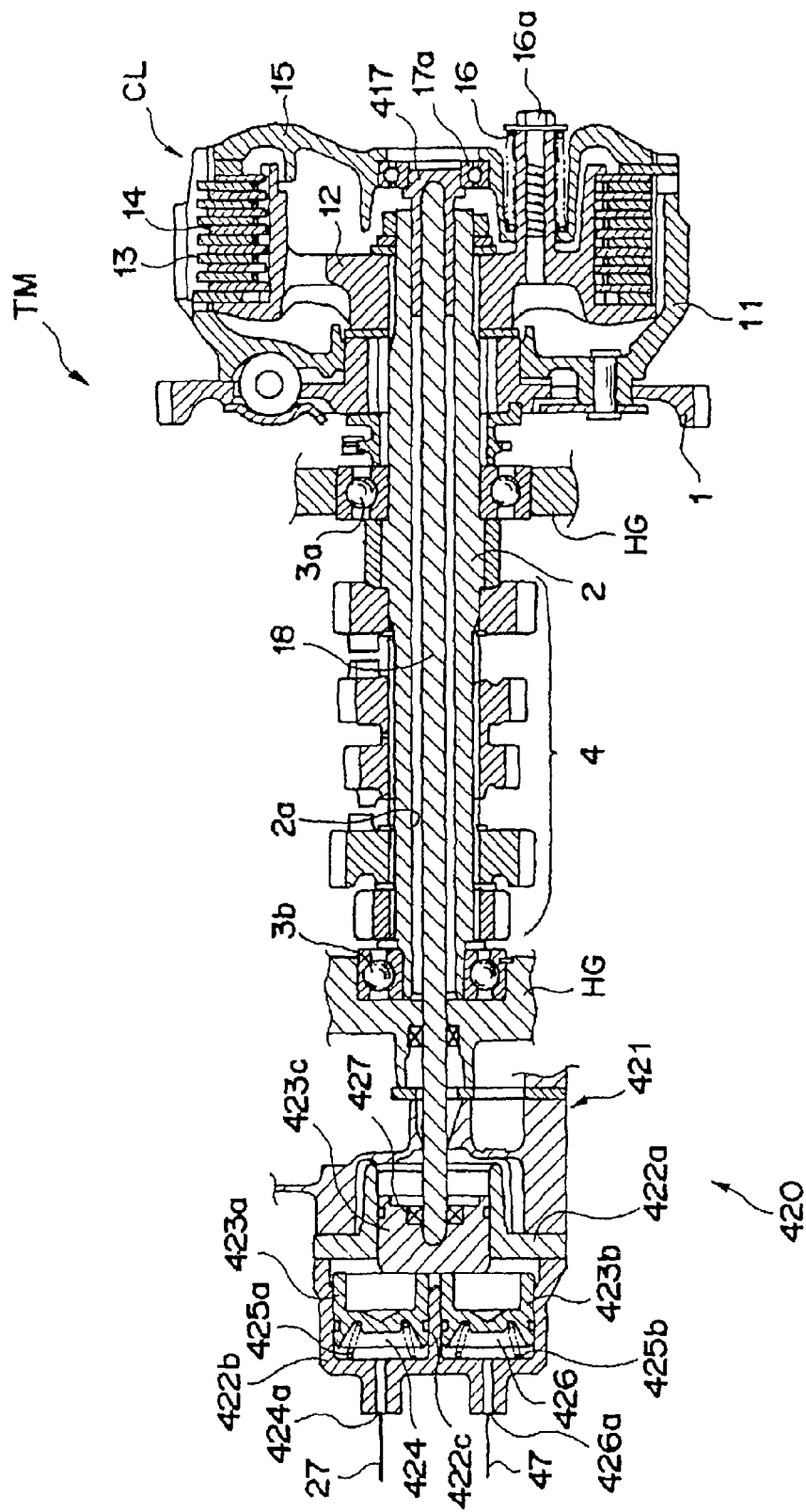
FIG. 33 is a cross-sectional view of the partial configuration of a power unit provided for a motorcycle according to the fourth embodiment.
Figure 34B:
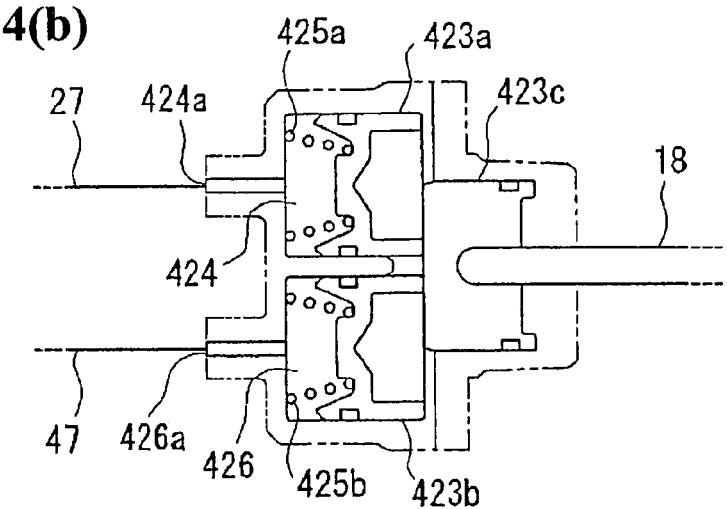
FIG. 34(b) illustrates the clutch slave cylinder operated in an assist clutch mode.
Figure 34C:
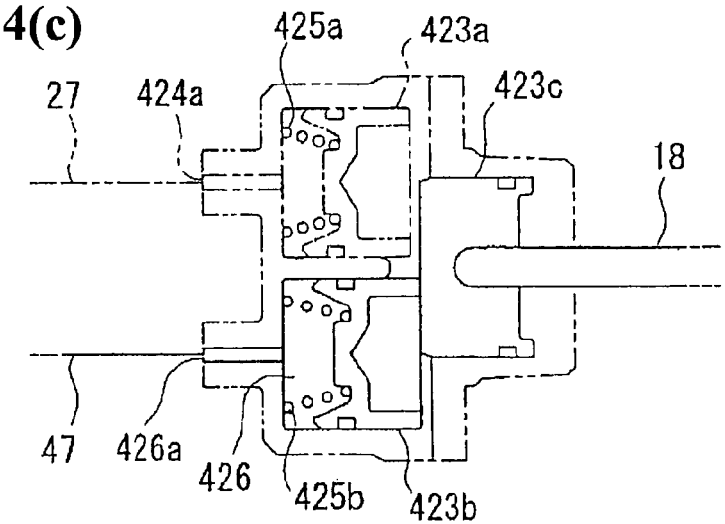
FIG. 34(c) illustrates the clutch slave cylinder operated in an auto-clutch mode.

The axial movement of the first clutch slave piston 423a and the axial movement of the second clutch slave piston 423b as shown in FIG. 34(b) press and move the push rod 8 rightward in FIG. 33. In this way, if the clutch lever 5 is operatively turned, the push rod 18 presses and moves the receiving member 417 rightward to release the clutch mechanism CL.

The clutch lever 5 may be returned from the state where it has been operatively turned, that is, operatively turned in the direction opposite to the direction of arrow A. In this case, the supply of he clutch hydraulic pressure to the clutch slave hydraulic chamber 424 via the inlet port 424a ceases so that the hydraulic pressure in the clutch slave hydraulic chamber 424 drops. In addition, the supply of the assist hydraulic pressure to the clutch slave hydraulic chamber 426 via the inlet port 426a ceases so that the hydraulic pressure in the clutch slave hydraulic chamber 426 drops. Thus, the restoring forces of the return springs 425a and 425b move the first clutch slave piston 423a and the second clutch slave piston 423b, respectively, to the left, reaching (returning to) the respective original positions. As the first and second slave piston 423a, 423b are returned to the respective original positions, the push rod guide 423a is pressed by the push rod 18 moved leftward by the restoring force of the pressing spring 16 and is moved leftward to the original position.

The foregoing describes the case where the auto-clutch mode switching button 92 is off-operated. When the auto-clutch switching button 92 is on-operated (the operation is brought into the auto-clutch switching mode), control is exercised as below.

If the rider on-operates the auto-clutch switching button 92, then a switching signal is sent from the auto-clutch mode switching button 92 to the control unit 90. In the state where the auto-clutch mode switching button 92 is on-operated, if the rider pedals the shift pedal 61 to execute gear shifting, the control unit 90 sends a control signal to the electric motor 31 via the signal line 95. This actuates the electric motor 31 so that the assist hydraulic pressure is inputted to the inlet port 426a from the motor actuator 40 via the assist hydraulic line 47. At this time, the clutch hydraulic pressure is not inputted to the inlet port 424a; therefore, only the hydraulic pressure in the clutch slave hydraulic chamber 426 is increased whereas the hydraulic pressure in the clutch slave hydraulic chamber 424 is not increased. The second clutch slave piston 423b is moved axially against the biasing force of the spring 425b to push and move the push rod guide 423c rightward (the state shown in FIG. 34(c)). The axial rightward movement of the push rod 18 releases the clutch mechanism CL. In short, even if the clutch lever 5 is not operatively turned, the clutch mechanism CL can be released by supplying the hydraulic pressure to the clutch slave cylinder 421 from the side of the motor actuator 40.

If the rider operatively turns the clutch lever 5 in the auto-clutch mode, the auto-clutch mode is cancelled. Thus, the clutch hydraulic pressure is supplied to the inlet port 424a and both the clutch hydraulic pressure from the clutch master cylinder 70 and the assist hydraulic pressure from the motor actuator 40 are supplied to the clutch slave cylinder 421. In this way, the assist clutch mode (the auto-clutch mode switching button 92 is off-operated) is restored.

The rider can optionally set any one of the assist clutch mode and the auto-clutch mode. If the auto-clutch mode is set during traffic congestion, it is not necessary to frequently perform the cumbersome turning operation of the clutch lever 5, which enables comfortable travel. After the traffic congestion is eliminated, the assist clutch mode can be restored only by operatively turning the clutch lever 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch device including:
   a clutch mechanism which is disposed in a power transmission route for transmitting a rotational drive force of an engine to a wheel to connect and disconnect transmission of the rotational drive force;
   a clutch actuator which operatively engages and disengages the clutch mechanism;
   a clutch lever which is provided on an operating handlebar and operated by a rider; and
   an assist pressure generator which generates assist pressure by driving an electric motor in response to the operation of the clutch lever;
   wherein assist pressure generated by the assist pressure generator is supplied to the clutch actuator and used as an assist force to operatively engage and disengage the clutch mechanism in response to operation of the clutch lever;
   said clutch mechanism comprising:
   a lever turning sensor which detects a turning-operation amount of the clutch lever;
   a gain adjustment device which controllably drives the electric motor on the basis of the operation amount of the clutch lever detected by the lever turning sensor and adjusts a driving force generation gain characteristic of the electric motor; and
   gain setting means which sets a value for the driving force generation gain characteristic by external operation;
   wherein gain adjustment device uses the gain characteristic set by the external operation of the gain setting means to controllably drive the electric motor in response to the operation of the clutch lever, wherein the assist pressure generator includes an assist-purpose crankshaft rotatably driven by the electric motor and an assist-purpose cylinder,
   wherein a rotation driving force of the electric motor is transmitted to the assist-purpose crankshaft via a plurality of idler gears.

2. The clutch device according to claim 1, wherein the clutch actuator includes a first clutch actuation input portion which receives an actuation force through a cable, and a second clutch actuation input portion which receives the assist pressure via an assist oil passage.

3. The clutch device according to claim 1, wherein the clutch actuator is configured to include a pressing member which is pressed by the assist hydraulic pressure to transmit the assist hydraulic pressure to the clutch mechanism for releasing actuation.

4. The clutch device according to claim 3, wherein pressing member is a push rod which is pressed by the assist hydraulic pressure via a slave cylinder of the clutch actuator to transmit the assist hydraulic pressure to the clutch mechanism for releasing the actuation.

5. The clutch device according to claim 1, wherein a piston member of the assist-purpose cylinder driven by a crank portion of the assist-purpose crankshaft rotatably driven by the electric motor is moved in a reciprocative manner in a cylinder chamber to generate the assist hydraulic pressure.

6. The clutch device according to claim 1, wherein the gain setting means is an assist force setting knob which is disposed at a position that is operable by a user of the clutch device.

7. The clutch device according to claim 1, further comprising a clutch cable extending between the clutch lever and a clutch arm of the clutch mechanism, and when the clutch lever is operated, the clutch cable moves the clutch arm in order to engage or disengage the clutch mechanism.

* * * * *